(12) United States Patent
Hayashi et al.

(10) Patent No.: US 8,517,890 B2
(45) Date of Patent: Aug. 27, 2013

(54) DRIVE CONTROL DEVICE FOR HYBRID VEHICLE

(75) Inventors: Koji Hayashi, Aichi-gun (JP);
Masatoshi Ito, Okazaki (JP); Takeshi Kanayama, Toyota (JP); Tsuyoshi Mikami, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 648 days.

(21) Appl. No.: 12/225,193

(22) PCT Filed: Apr. 11, 2008

(86) PCT No.: PCT/JP2008/057213
§ 371 (c)(1),
(2), (4) Date: Jun. 22, 2010

(87) PCT Pub. No.: WO2008/133061
PCT Pub. Date: Nov. 6, 2008

(65) Prior Publication Data
US 2010/0263951 A1      Oct. 21, 2010

(30) Foreign Application Priority Data
Apr. 20, 2007  (JP) ................. 2007-111550

(51) Int. Cl.
*B60W 20/00*    (2006.01)
(52) U.S. Cl.
CPC .................................. *B60W 20/00* (2013.01)
USPC ........................................ 477/3; 180/62.285
(58) Field of Classification Search
CPC ..................................................... B60W 20/00
USPC ................... 180/65.31, 65.7, 65.265, 65.275, 180/65.285, 65.21; 477/3, 107, 111, 906, 477/97, 96, 156, 157
See application file for complete search history.

(56) References Cited

U.S. PATENT DOCUMENTS

| | | | | |
|---|---|---|---|---|
| 1,558,806 | A | * | 10/1925 | Hess, Jr. .......................... 290/10 |
| 5,696,680 | A | * | 12/1997 | Ichioka et al. .................. 701/67 |

(Continued)

FOREIGN PATENT DOCUMENTS

| | | |
|---|---|---|
| JP | A-53-13059 | 2/1978 |
| JP | A-57-97942 | 6/1982 |

(Continued)

*Primary Examiner* — J. Allen Shriver, II
*Assistant Examiner* — Jacob Meyer
(74) *Attorney, Agent, or Firm* — Oliff & Berridge, PLC

(57) ABSTRACT

Due to the reduction of a discharge amount of a mechanical oil pump by a lowering of the idling rotation speed, a slip in a hydraulic power transmission apparatus and a blow up of an electric motor for running due to a delay of the rising of the oil pressure upon the sudden start and the like are prevented. While avoiding the slip and the blow up, the idling rotation speed is lowered so as to make the engine noise small. When the return determination from the idling state is performed based on the shift operation from P to D, at step S5, a torque TMG2 of a second motor/generator MG2 is temporarily restricted. As a result, upon the sudden start from the idling state, even when the rising of the oil pressure delays, the second brake B2 engaged upon the starting is prevented from slipping, and the second motor/generator MG2 is prevented from blowing up. As a result, while avoiding the slip of the second brake B2 and the blow up of the second motor/generator MG2 due to the hydraulic response delay, an idling rotation speed N Eidl is lowered so that the engine noise can be reduced.

7 Claims, 15 Drawing Sheets

(56) References Cited

U.S. PATENT DOCUMENTS

| | | | |
|---|---|---|---|
| 5,944,632 A * | 8/1999 | Hara et al. | 477/158 |
| 6,110,072 A * | 8/2000 | Harada et al. | 477/157 |
| 6,647,326 B2 * | 11/2003 | Nakamori et al. | 701/22 |
| 7,137,924 B2 | 11/2006 | Ito et al. | |
| 7,713,163 B2 * | 5/2010 | Hayashi et al. | 477/3 |
| 2002/0094910 A1 * | 7/2002 | Endo et al. | 477/97 |
| 2003/0045988 A1 * | 3/2003 | Suzuki et al. | 701/54 |
| 2003/0109970 A1 * | 6/2003 | Nakamori et al. | 701/22 |
| 2003/0171187 A1 * | 9/2003 | Aoki et al. | 477/107 |
| 2004/0038774 A1 * | 2/2004 | Kuroda et al. | 477/3 |
| 2004/0063539 A1 * | 4/2004 | Endo et al. | 477/45 |
| 2007/0119640 A1 * | 5/2007 | Ito et al. | 180/65.4 |
| 2008/0139360 A1 * | 6/2008 | Hayashi et al. | 477/3 |

FOREIGN PATENT DOCUMENTS

| | | |
|---|---|---|
| JP | A-61-82052 | 4/1986 |
| JP | A-61-105341 | 5/1986 |
| JP | A-62-108657 | 5/1987 |
| JP | A-63-38624 | 2/1988 |
| JP | A-64-40759 | 2/1989 |
| JP | A-2-74419 | 3/1990 |
| JP | A-3-107551 | 5/1991 |
| JP | A 5-231226 | 9/1993 |
| JP | U-5-69328 | 9/1993 |
| JP | A-5-280399 | 10/1993 |
| JP | A 06-193482 | 7/1994 |
| JP | A-7-174218 | 7/1995 |
| JP | A 9-158961 | 6/1997 |
| JP | A-10-212983 | 8/1998 |
| JP | A-2000-230442 | 8/2000 |
| JP | A-2001-41067 | 2/2001 |
| JP | A 2001-224104 | 8/2001 |
| JP | A-2002-118901 | 4/2002 |
| JP | A-2002-155865 | 5/2002 |
| JP | A 2002-206630 | 7/2002 |
| JP | A 2003-9309 | 1/2003 |
| JP | A-2003-205768 | 7/2003 |
| JP | A 2004-069070 | 3/2004 |
| JP | A 2004-211600 | 7/2004 |
| JP | A 2005-207304 | 8/2005 |
| JP | A-2005-207305 | 8/2005 |
| JP | A-2006-183817 | 7/2006 |

* cited by examiner

| | SLB1 | SLB2 | B1 | B2 |
|---|---|---|---|---|
| LOW GEAR POSITION L (1ST-SPEED) | ◯ | ◯ | × | ◯ |
| HIGH GEAR POSITION H (2ND-SPEED) | × | × | ◯ | × |

DRIVE CONTROL DEVICE FOR HYBRID VEHICLE

TECHNICAL FIELD

The present invention relates to a drive control device for hybrid vehicle. In particular, the invention relates to a technology, with avoiding occurrence of a slip and the like in a hydraulic power transmission apparatus due to oil pressure insufficiency upon a sudden start and the like from an idling state, for reducing an engine noise during an idling by lowering an idling rotation speed.

BACKGROUND ART

As a drive control device for hybrid vehicle, those having (a) an engine used as a driving source for running and an electric motor for running, (b) a hydraulic power transmission apparatus, and (c) a hydraulic pressure control circuit, are known. The hydraulic power transmission apparatus is at least disposed in the power transmission path of the electric motor for running and transmits a power based on a torque capacity generated by an oil pressure. The hydraulic pressure control circuit includes a mechanical oil pump driven by the engine, and an electric oil pump driven by an electric motor for pumping different from the electric motor for running, and supplies the oil of a predetermined oil pressure to the hydraulic power transmission apparatus.

Following Patent Document 1 discloses an example of the device. In this device, since the electric motor for running receives a reaction force upon starting of the engine, a load of the hydraulic power transmission apparatus becomes large. In the meantime, a discharge amount of the mechanical oil pump driven by the engine is small, so that a slip is likely to occur due to the oil pressure insufficiency of the hydraulic power transmission apparatus. Hence, until the engine can completely perform self-supported rotation, the torque of the electric motor for running is restricted, and the electric oil pump is caused to operate to secure the oil pressure.

[Patent Document 1] Japanese Patent Application Laid-Open No. 2005-207304

DISCLOSURE OF THE INVENTION

Problem to be Solved by the Invention

Now, in such a hybrid vehicle, for reducing the engine noise even smaller when an accelerator is turned OFF and the engine is in an idling state, lowering the idling rotation speed of the engine uniformly or under specific conditions is desired. However, when the idling rotation speed is lowered in this manner, the discharge amount of the mechanical oil pump driven by the engine reduces. Hence, when an engine is suddenly started by depressing an accelerator deeply from the idling state of the engine and the like, the oil pressure rise is delayed for the torque rise of the electric motor for running, there has been a fear that the hydraulic power transmission apparatus may slip or the electric motor for running may blow up.

The present invention has been made in view of the above described situations, and an object of the invention is, first, to avoid the slip occurred in the hydraulic power transmission apparatus and the blow up of the electric motor for running, which are caused by the rise delay of the oil pressure upon the sudden start and the like by the decrease of a discharge amount of the mechanical oil pump due to the lowered idling rotation speed. Another object of the invention is, with avoiding the slip occurred in the hydraulic power transmission apparatus and the blow up of the electric motor for running, to lower the idling rotation speed for thereby reducing the engine noise during the idling.

Means for Solving the Problem

For achieving the above object, a first aspect of the invention relates to a drive control device for hybrid vehicle. The hybrid vehicle includes (a) an engine and an electric motor for running i.e. traveling used as a driving source for running; (b) a hydraulic power transmission apparatus disposed at least in a power transmission path of the electric motor for running to transmit a power based on a torque capacity generated by an oil pressure; and (c) an hydraulic control circuit, having a mechanical oil pump driven by the engine and an electric oil pump driven by an electric motor for pumping independent from the electric motor for running, and supplying an oil of a predetermined oil pressure to the hydraulic power transmission apparatus.

The drive control device comprises (d) return determining means that determines whether the engine returns or has a high possibility of returning to an normal output state from an idling state; and (e) torque restricting means that temporarily restricts an increase of the torque of the electric motor for running when the return is determined by the return determining means.

In a second aspect of the invention, in the first aspect, the drive control device further includes idling rotation speed lowering means that lowers the idling rotation speed of the engine under a predetermined condition, and the return determining means determines whether the lowering control of the idling rotation speed by the idling rotation speed lowering means is released.

In a third aspect of the invention, in the second aspect, the idling rotation speed lowered by the idling rotation speed is set, with using the oil temperature of the hydraulic control circuit as a parameter, to be larger as the oil temperature becomes higher.

In a fourth aspect of the invention, in the second or third aspect, the idling rotation speed lowered by the idling rotation speed lowering means is set such that the restricted torque of the electric motor for running by the torque restricting means falls within a predetermined range.

In a fifth aspect of the invention, in one of the first to fourth aspects, the torque restricting means restricts the torque of the electric motor for running by an the upper limit guard value which becomes large by a predetermined increasing gradient, and the increasing gradient is set, with using the oil temperature of the hydraulic control circuit as a parameter, to be smaller as the oil temperature becomes lower.

In a sixth aspect of the invention, in one of the first to fifth aspects, the drive control device further includes on-return pump assist means that assists the electric oil pump, the on-return pump assist means operating the electric oil pump to assist a supply of the oil when the return is determined by the return determining means so that the restricted torque of the electric motor for running by the torque restricting means falls within a predetermined range, the on-return pump assist means terminating the assist of the electric oil pump when the engine, returning from the idling state, reaches to an oil pressure restoring state in which an increase of the rotation speed of the mechanical oil pump renders an oil pressure capable of securing a torque capacity necessary for the hydraulic power transmission apparatus to transmit the torque of the electric motor for running.

In a seventh aspect of the invention, in one of the first to sixth aspects, the drive control device further includes release means that releases the torque restriction of the electric motor for running, the release means determining whether the engine, returning from the idling state, reaches to an oil pressure restoring state in which an increase of the rotation speed of the mechanical oil pump renders an oil pressure capable of securing a torque capacity necessary for the hydraulic power transmission apparatus to transmit the torque of the electric motor for running, and the release means releasing the torque restriction of the electric motor for running by the torque restricting means, upon determination of the oil pressure restoring state.

For achieving the above object, an eighth aspect of the invention relates a drive control device for hybrid vehicle. The hybrid vehicle includes (a) an engine and an electric motor for running used as a driving source for running; (b) a hydraulic power transmission apparatus disposed at least in a power transmission path of the electric motor for running to transmit a power based on a torque capacity generated by an oil pressure; and (c) a hydraulic control circuit, including a mechanical oil pump driven by the engine and an electric oil pump driven by an electric motor for pumping independent from the electric motor for running, and supplying an oil of a predetermined oil pressure to the hydraulic power transmission apparatus.

The drive controller comprises (d) idling rotation speed setting means that sets an idling rotation speed of the engine, (e) the idling rotation speed being set by the idling rotation speed setting means, with using the oil temperature of the hydraulic control circuit as a parameter, to be higher as the oil temperature becomes higher, so that when the engine from the idling state returns to a normal output state to increase the rotation speed of the mechanical oil pump, an oil pressure is rendered to secure a torque capacity necessary for the hydraulic power transmission apparatus to transmit the torque of the electric motor for running.

Advantage of the Invention

In such drive control device for the hybrid vehicle, when a return determining means determines the engine returns or is highly likely to return to a normal output state from the idling state, the torque increase of the electric motor for running i.e. traveling is temporarily restricted by a torque restricting means. Hence, even when a rise of the oil pressure delays upon the sudden start or the sudden acceleration and the like from the idling state, due to the low idling rotating speed and the small discharge amount of the mechanical oil pump, the slip occurred in the hydraulic power transmission apparatus and the blow up of the electric motor for running are avoided. As a result, the slip in the hydraulic power transmission apparatus and the blow up of the electric motor for running due to a hydraulic response delay i.e. delayed hydraulic response are avoided. With avoiding the slip and the blow up, the idling rotation speed is lowered uniformly or under specific conditions to reduce the engine noise during idling of the engine.

The second aspect of the invention includes the idling rotation speed lowering means for lowering the idling rotation speed of the engine under the specific conditions. The return determining means determines whether the lowering control of the idling rotation speed by the idling rotation lowering means is released. Upon releasing the lowering control, the torque restricting means temporarily restricts the torque increase of the electric motor for running. As a result, upon the sudden start or the sudden acceleration and the like from the idling state, with avoiding the slip in the hydraulic power transmission apparatus or the blow up of the electric motor for running due to the delayed hydraulic response, the idling rotation speed is lowered by the idling rotation speed lowering means to reduce the engine noise.

In the meantime, when the torque restricting means restricts the torque increase of the electric motor for running in this manner, a starting performance and an acceleration performance from the idling state may be impaired. However, noted that the second aspect of this invention relates to a technology for lowering the idling rotation speed under specific conditions, and does not necessarily lower the idling rotation speed uniformly upon turning OFF the accelerator. For example, only when a shift lever is operated to a non-running position such as P (parking) and N (neutral), the idling rotation speed lowering means lowers the idling rotation speed so as to reduce the engine noise.

In addition, only when the shift lever is operated to a running position such as D (drive) and R (reverse) from the non-running position to release the lowering restriction, the torque restricting means restricts the torque of the electric motor for running. In this manner, upon starting and accelerating of the vehicle in the idling state with holding the shift lever at the running positions such as D and R, the torque of the electric motor for running is not restricted by the torque restricting means. Thus, influence of the restricted torque on the starting and the acceleration performances can be restricted to the necessity minimum.

In the third aspect of the invention, the idling rotation speed lowered by the idling rotation speed lowering means is set, with using the oil temperature of the hydraulic control circuit as a parameter, to be higher as the oil temperature becomes higher. Hence, despite of difference i.e. variation of an oil leaked amount resulted from difference i.e. variation of the oil temperature, the mechanical oil pump can raise the oil pressure by the predetermined responsiveness in accordance with the release of the lowering control of the idling rotation speed. In addition, during the low oil temperature with the small leaked amount, the idling rotation speed is further lowered, so that the engine noise can be reduced furthermore. That is, in general, the lower viscosity of the oil in the higher oil temperature leads to the increased leaked amount. For this reason, the more oil corresponding to this part is required to be supplied. However, the idling rotation speed is higher as the oil temperature becomes higher, which prevents an oil lack due to the increase of the leaked amount. At the same time, due to the rise of the engine rotation speed resulted from the release of the lowering control of the idling rotation speed, the oil pressure can be raised by the predetermined responsiveness.

In a fourth aspect of the invention, the idling rotation speed lowered by the idling rotation speed lowering means is set such that the restricted torque of the electric motor for running by the torque controlling means falls within the predetermined range. Hence, at the sudden start or the sudden acceleration and the like of the engine from the idling state, a feeling of slowness i.e. taking-time and an abnormal feeling caused to the driver by the restricted torque of the electric motor for running are dissolved or can be hardly caused. That is, the torque of the electric motor for running is restricted in the range hardly causing the feeling of slowness and the abnormal feeling to the driver. In addition, the idling rotation speed when lowered by the idling rotation speed lowering means is set relatively higher. This is to prevent the slip in the hydraulic power transmission apparatus and the blow up of the electric motor for running due to the delayed hydraulic response by such a degree of the restricted torque.

The fifth aspect of the invention is the case where the torque of the electric motor for running is restricted by an upper limit guard value which becomes large by a predetermined increase gradient. The increase gradient is set, with using the oil temperature of the hydraulic control circuit as a parameter, to be smaller as the oil temperature becomes lower. Hence, despite of the difference of the hydraulic responsiveness due to the viscosity change of the oil accompanied with i.e. resulted from the difference of the oil temperature, the torque restricting means appropriately controls the torque of the electric motor for running. Specifically, with preventing the slip in the hydraulic power transmission apparatus and the blow up of the electric motor for running due to the delayed hydraulic response upon the sudden start or the sudden acceleration and the like from the idling state, the influence by the restricted torque on the starting and accelerating performances can be suppressed as much as possible.

That is, when the oil temperature becomes, for example, approximately −30° C., the oil has the high viscosity and is deteriorate in the flow property, which deteriorates the hydraulic responsiveness inside the hydraulic power transmission apparatus. Hence, the increase gradient of the upper limit guard value of the torque of the electric motor for running is set small, to make the limit time of the torque of the electric motor for running is made long, thereby preventing the slip in the hydraulic power transmission apparatus and the blow up of the electric motor for running accompanied with i.e. resulted from the deteriorated hydraulic responsiveness.

In the meantime, during the high oil temperature when the oil has the low viscosity and is good in the flow property, the hydraulic responsiveness inside the hydraulic power transmission apparatus is quick. With this taken into consideration, the large gradient of the upper limit guard value of the torque of the electric motor for running can shorten the time limit, so that the influence on the starting and acceleration performances can be suppressed to the necessity minimum.

In the sixth aspect of the invention, the on-return pump assist means operates the electric oil pump to assist the oil supply when the return determination is performed by the return determining means so that the restriction of the torque of the electric motor for running by the torque restricting means falls within the predetermined range. Hence, upon the sudden start or the sudden acceleration and the like of the engine from the idling state, the slowness feeling and the abnormal feeling caused to the driver by the restricted torque of the electric motor for running are dissolved or can be hardly caused.

That is, within the range hardly causing a feeling of slowness and an abnormal feeling to the driver, the torque of the electric motor for running is restricted. At the same time, the on-return pump assist means operates the electric oil pump to assist the oil supply so that the slip in the hydraulic power transmission apparatus and the blow up of the electric motor for running due to the hydraulic response delay are prevented by such restriction of the torque. Appropriately setting the assist amount can lower the idling rotation speed furthermore to further reduce the engine noise.

The seventh aspect of the invention includes a releasing means for releasing the torque restriction of the electric motor for running. When the rotation speed of the mechanical oil pump increases by the engine returned from the idling state, the releasing means determines whether the hydraulic power transmission apparatus reaches the oil pressure restoring state to render the oil pressure capable of securing the torque capacity. This torque capacity is necessary for the hydraulic power transmission apparatus to transmit the torque of the electric motor for running. When the hydraulic power transmission apparatus establish the oil pressure restoring state, the restriction of the torque of the electric motor for running by the torque restricting means is released. With reliably preventing the slip in the hydraulic power transmission apparatus and the blow up of the electric motor for running due to the delayed hydraulic response, the torque restriction of the electric motor for running by the torque restricting means is suppressed to the necessity minimum. In this manner, the influence of the torque restriction on the starting and acceleration performances are suppressed to the necessity minimum.

In the eighth aspect of the invention, the idling rotation speed is set by the idling rotation speed setting means to render the predetermined oil pressure. This oil pressure can secure the torque capacity necessary for the hydraulic power transmission apparatus to transmit the torque of the electric motor for running. This oil pressure is rendered during the return of the engine from the idling state, when the rotation speed of the mechanical oil pump is increased by the engine upon return from the idling state. Hence, during the sudden start or the sudden acceleration and the like from the idling state, the slip in the hydraulic power transmission apparatus and the blow up of the electric motor for running due to the delayed hydraulic response can be avoided. Moreover, with avoiding the slip and the blow up, the idling rotation speed is lowered as much as possible to reduce the engine noise.

In particular, the idling rotation speed is set, with using the oil temperature of the hydraulic control circuit as a parameter to be higher as the oil temperature becomes higher. Hence, similarly to the third aspect of the invention, despite of the difference of the oil leaked amount accompanied with the difference of the oil temperature, upon returning from the idling state, the mechanical oil pump can raise the oil pressure by the predetermined responsiveness. In addition, at the low oil temperature with the small leaking amount, the idling rotation speed is further lowered to further reduce the engine noise.

Here, the hybrid vehicle of the present invention is configured to include the engine such as a gasoline engine and a diesel engine serving as an internal combustion engine, and the electric motor for running such as an electric motor and a motor/generator. The engine and the electric motor for running are connected in series or connected via a synchronizing/distributing mechanism such as a planetary gear device, to rotationally drive the same driving wheel. However, they can be configured to rotationally drive separate driving wheels, and other variety of modes can be employed.

The hybrid vehicle is configured to include a starting and acceleration i.e. starting/acceleration mode for running, for example, by using both the engine and the electric motor for running upon the high load application such as the starting or the acceleration and the like from the idling state with the accelerator turned OFF. However, the vehicle is sufficiently configured such that at least the electric motor for running may be operated to rotationally drive the driving wheel via the hydraulic power transmission apparatus.

Although the hydraulic power transmission apparatus is installed, for example, between the electric motor for running and the driving wheel, when the electric motor for running and the engine rotationally drive the common or same driving wheel, the hydraulic power transmission device may be installed among the electric motor for running, the engine, and the driving wheel. As the hydraulic power transmission apparatus, a stepwise variable automatic transmission such as a planetary gear type and a biaxial mesh type, and a belt-type continuously variable transmission are available. The planetary gear type transmission establishes a plurality of gear positions different in gear ratio according to engaging and releasing states of a hydraulic frictional engagement device, and switches between forward running and backward running. The belt-type continuously variable transmission generates a belt pinching force by one hydraulic cylinder of a pair of variable pulleys to transmit the power.

The hydraulic control circuit is configured by including a line pressure regulating valve for regulating a line pressure PL, and an electromagnetic pressure regulating valve for shifting and nipping pressure control for controlling an engagement oil pressure for the hydraulic power transmission apparatus. The electric oil pump is operated, for example, when the engine is stopped during the motor running mode and the like for running only by the electric motor for running. In the engine running mode for running using the engine a power source, an engine plus motor running mode, and the like, a configuration is made such that the electrical oil pump is stopped for improving the fuel consumption and the like, and the oil is supplied only by the mechanical oil pump. However, the electric oil pump may be always operated, in full-time. In this manner, various modes may be adopted.

The return determining means determines whether the engine returns or is highly likely to return to the normal output state from the idling state. The return determining means is configured for example to determine whether the accelerator is ON-operated based on an accelerator operating amount, whether an idling switch of a throttle valve open degree sensor is turned OFF from ON, and whether a braking operation is released, and the like. However, when the shift lever is held at the non-running position such as P and N, the return determining mean can perform the determination by whether the shift lever is operated to the running position such as D and R from the non-running position, or whether a shifting lock releasing operation is performed. This releasing operation is performed for releasing a shifting lock mechanism to prohibit the shift lever from being pulled out from the P position is performed. In this manner, various modes may be adapted.

In the case of the second aspect of the invention, release of the lowering control of the idling rotation speed can be determined depending on the releasing condition of the lowering control being satisfied or the determination to release the lowering control being performed. In the first aspect of the invention also, the determination can be performed based on the determination to release the idling state by the engine control and the like is performed, or whether the releasing condition for releasing the idling state is satisfied, and the like.

The torque restricting means is configured similarly to the fifth aspect of the invention such that the torque of the electric motor for running is restricted by the upper limit guard value increasing by the predetermined increase gradient. The restriction is released when the upper limit guard value reaches the maximum torque. However, the restriction may be performed for a predetermined time period by the predetermined fixed upper limit guard value, and various modes may be adopted.

This torque restricting means prevents the torque of the electric motor for running from rising abruptly upon the sudden start and the like when the accelerator is deeply operated from the idling state. It is set at a relatively high torque value usually, and the torque of the electric motor for running hardly reaches the upper limit guard value where the torque is restricted during the normal accelerator operation. However, even during the normal accelerator operation, the slip in the hydraulic power transmission apparatus and the blow up of the electric motor for running due to the delayed hydraulic response is prevented. Accordingly, the torque restriction may be performed when the torque of the electric motor for running may reach the upper limit guard value.

The idling rotation speed lowering means of the second aspect of the invention is configured, for example under the condition that the shift lever is held at the non-running position such as P and N during the vehicle stopping when the accelerator is turned OFF, to decrease the idling rotation speed lower than usual rotation speed, and release the lowering control when the shift lever is operated to the running position such as D and R from the non-running position. However, it is configured during the vehicle stopping when the accelerator is turned OFF and the brake is depressed and the like, the idling rotation speed is lowered than usual rotation speed under the condition that a possibility of immediate starting is low. In this manner, various modes may be adopted.

In the third aspect of the invention, the idling rotation speed lowered by the idling rotation lowering means is set, with using the oil temperature of the hydraulic control circuit as a parameter to be higher as the oil temperature becomes higher. However, for carrying out other aspects of the invention, the idling rotation speed may be constant regardless of the oil temperature.

Further, in the fourth aspect of the invention, the idling rotation speed is set such that the restricted torque of the electric motor for running by the torque restricting means falls within the predetermined range. For example, the idling rotation speed is set such that the slowness feeling i.e. time-taking feeling and the abnormal feeling are not affected to the driver by the restriction of the torque. However, for carrying out other aspects of the invention, the idling rotation speed can be set as low as possible without considering the lowering of the starting and acceleration performances by the torque restriction. Other various modes can be adopted.

In the fifth aspect of the invention, the torque of the electric motor for running is restricted by the upper limit guard value which increases by a predetermined increase gradient. Here, its increase gradient is set, with using the oil temperature of the hydraulic control circuit as the parameter to be small as the oil temperature becomes low. However, when the leaked amount increases in the high oil temperature, the hydraulic responsiveness is deteriorated. In view of this, the increase gradient can be made constant or small reversely when the oil temperature rises up to the predetermined value or more.

In the sixth aspect of the invention, the electric oil pump is operated to assist the oil supply, which means that the oil supply amount by the electric oil pump increases more than usual supply amount. The operating of the electric oil pump includes staring thereof from stopped state, and increasing the rotation speed during operation thereof to increase the oil supply amount. However, for carrying out the other aspects of the invention, the oil supply is not necessarily assisted by the electric oil pump.

In the seventh aspect of the invention, when the oil pressure restoring state is realized by the increasing rotation speed of the mechanical oil pump by the engine returning from the idling state, the torque restricting means releases the torque restriction of the electric motor for running. The determination as to whether the oil pressure restoring state being realized is performed based on following facts or phenomena, which is common to the sixth aspect of the invention. The facts include whether or not the engine rotation speed reaches the predetermined value or more, the rotation speed of the mechanical oil pump reaches the predetermined value or more, the predetermined oil pressure value of the hydraulic control circuit reaches the predetermined value or more, the elapsed time after the return determination by the return determining means reaches the predetermined time, and the like. In this manner, various modes may be adopted.

The torque of the electric motor for running is related to the determination of the hydraulic recovery state, and a judgment standard is desirably set with using an accelerator operating amount corresponding to the required drive force of the driver, the required torque of the electric motor for running set based on the accelerator operation amount, and the like as a parameter. However, a predetermined judgment standard capable of transmitting the maximum torque of the electric motor for running can be set.

When the upper limit guard value is changed by the predetermined increase gradient for carrying out the other aspects of the invention, for example, the torque restriction of the electric motor for running can be released if the upper limit gaud value reaches the maximum torque. In this manner, various releasing ways can be performed according to modes of the restriction of the torque.

The idling rotation speed setting means of the eighth aspect of the invention is, for example, configured to set the idling rotation speed itself upon turning OFF of the accelerator according to the oil temperature. However, as the idling rotation speed lowering means in the second aspect of the invention, when it lowers the idling rotation speed under a predetermined condition such as the shift lever being operated to the non-running position, the lowering idling rotation speed may be set according to the oil temperature. In this manner, various modes may be adopted.

DESCRIPTION OF REFERENCE NUMERALS

Figure 1:
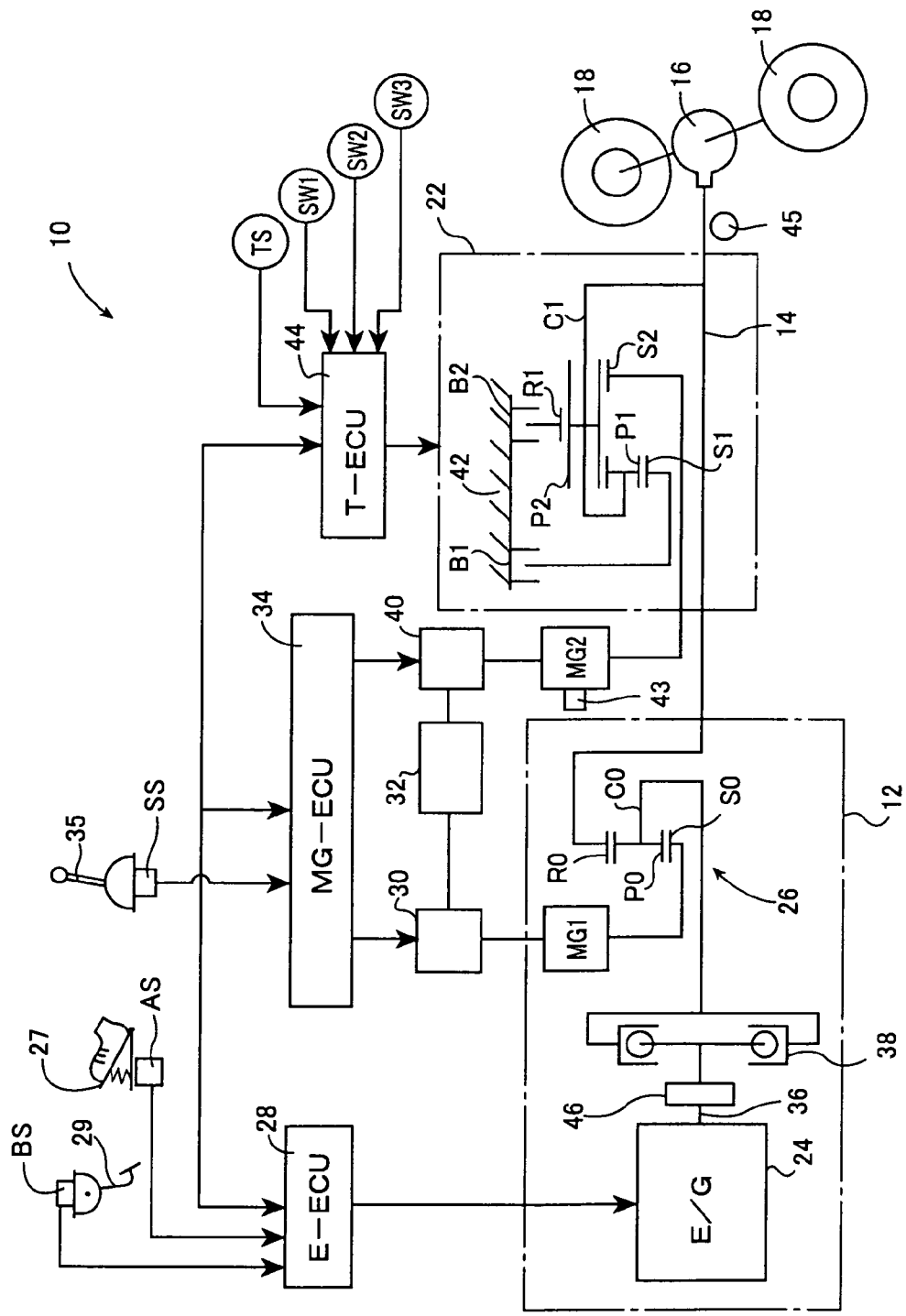
FIG. 1 is a view explaining a schematic configuration of a drive control device for hybrid vehicle which is an embodiment of the present invention.

10: Drive control device for hybrid vehicle
22: Automatic transmission (Hydraulic power transmission apparatus)
24: Engine (Drive source for running)
28, 34, 44: Electronic control device
46: Mechanical oil pump
48: Electric oil pump
50: Hydraulic control circuit
140: Idling rotation speed lowering means
142: Return determining means
144: Torque restricting means
152: Release means
154: On-return pump assist means
162: Idling rotation speed setting means
MG2: Second motor/generator (electric motor for running)

BEST MODE FOR CARRYING OUT THE INVENTION

An embodiment of the present invention will be described below in detail with reference to the drawings.

Preferred Embodiments

In the following description and the accompanying drawings, the present invention will be described in more detail with reference to exemplary embodiments.

FIG. 1 is a schematic diagram illustrating a drive control device 10 to which a first embodiment as an example of the invention is applied. Referring to FIG. 1, in the drive control device 10, torque of a first drive force generation source 12 that is a main drive source is transmitted to an output shaft 14 that functions as an output member, and the torque is transmitted from the output shaft 14 to a pair of left and right driving wheels 18 via a differential gear device 16. Besides, in the drive control device 10, a second motor/generator 20 capable of selectively executing a power running control of outputting the drive power for running the vehicle and a regenerative control for recovering energy is provided. The second motor/generator 20 is linked to the output shaft 14 via an automatic transmission 22. Therefore, the torque transmitted from the second motor/generator 20 to the output shaft 14 is increased or decreased in accordance with the speed change ratio γs (=the rotation speed NMG2 of the MG2/the rotation speed NOUT of the output shaft 14) that is set by the automatic transmission 22. The second motor/generator MG2 corresponds to a claimed electric motor for running, and the automatic transmission 22 corresponds to a claimed hydraulic power transmission apparatus.

The automatic transmission 22 is constructed so as to establish two gear positions including a high gear position H and a low gear position L whose speed change ratios γs are greater than or equal to "1". Therefore, at the time of power running when torque is output from the second motor/generator 20, the torque can be increased by the automatic transmission 22 while being transmitted to the output shaft 14. Hence, the second motor/generator 20 is constructed with a further reduced capacity or in a further reduced size. Due to this, for example, in the case where the rotation speed NOUT of the output shaft 14 increases in association with high gear position H, the speed change ratio γs is changed to thereby lower i.e. decrease the rotation speed of the second motor/generator 20, in order to maintain a good state of the operation efficiency of the second motor/generator 20. In the case where the rotation sped NOUT of the output shaft 14 lowers, the speed change ratio γs is increased to increase the rotation speed of the MG2.

The first drive force generation source 12 is constructed mainly of an engine 24, a first motor/generator MG1, and a planetary gear device 26 provided for synthesizing/distributing torque between the engine 24 and the first motor/generator MG1. The engine 24 is a publicly known internal combustion engine that outputs power by burning fuel, such as a gasoline engine, a diesel engine, etc. The engine 24 is constructed so that states of operation thereof, such as a the throttle opening degree, the intake air amount, the fuel supply amount, the ignition timing, etc., are electrically controlled by an engine-controlling electronic control device (E-ECU) 28 that is made up mainly of a microcomputer. The electronic control device 28 is supplied with detection signals from an accelerator operation amount sensor AS that detects the operation amount $A_{cc}$ of an accelerator pedal 27, a brake sensor BS for detecting operation of a brake pedal 29, etc.

The first motor/generator MG1 is, for example, a synchronous electric motor, and is constructed to selectively perform the function as an electric motor of generating drive torque and the function as an electric power generator. The first motor/generator MG1 is connected to an electricity storage device 32, such as a battery, a capacitor, etc., via an inverter 30. Then, the inverter 30 is controlled by a motor/generator-controlling electronic control device (MG-ECU) 34 made up mainly of a microcomputer so that the output torque of the MG1 or the regenerative torque is adjusted or set. The electronic control device 34 is supplied with detection signals representing operation signals and the like, from an operation position sensor SS that detects the operation position of a shift lever 35 such as P position for parking, a N position for interrupting the power transmission, a D position for forward running, a R position for rearward running, and the like.

The planetary gear device 26 is a single-pinion type planetary gear mechanism that includes three rotating elements: a sun gear S0, a ring gear R0 disposed concentrically with the sun gear S0, and a carrier C0 that supports pinions P0 meshing with the sun gear S0 and the ring gear R0, in such a manner that the pinions P0 are rotatable about their own axes and also revolvable. The planetary gear device 26 causes known differential effect. The planetary gear device 26 is provided concentrically with the engine 24 and the automatic transmission 22. Since the planetary gear device 26 and the automatic transmission 22 are constructed substantially symmetrically about a center line, the half portions thereof below the center line are omitted in FIG. 1.

In this embodiment, a crankshaft 36 of the engine 24 is linked to the carrier C0 of the planetary gear device 26 via a damper 38. The sun gear S0 is linked to the first motor/generator MG1, and the output shaft 14 is linked to the ring gear R0. The carrier C0 functions as an input element, and the sun gear S0 functions as a reaction force element, and the ring gear R0 functions as an output element. Noted that this linking way can be easily modified, and as the planetary gear device 26 the double-pinion type planetary gear device can be used.

Figure 2:
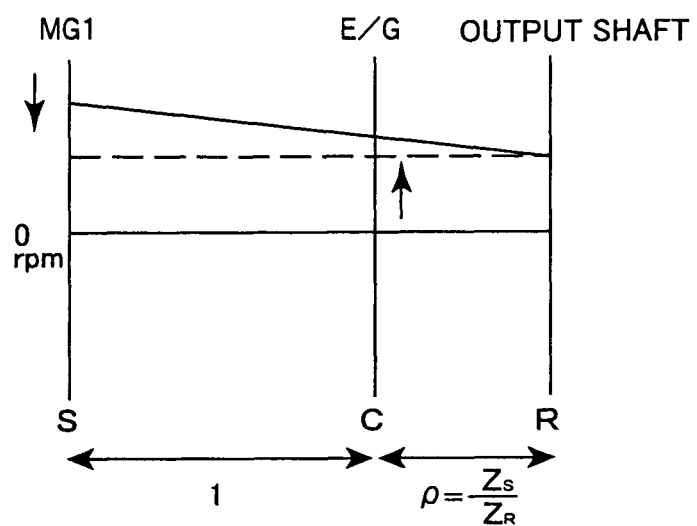
FIG. 2 is a collinear view explaining an operation of a planetary gear device provided in a first drive force generating source in the drive control device for the hybrid vehicle of FIG. 1.

Relative relationships among the rotating elements of the single-pinion type planetary gear device 26 that functions as a torque combining-distributing mechanism are shown by an alignment chart in FIG. 2. In the alignment chart, a vertical axis S, a vertical axis C, and a vertical axis R represent the rotation speed of the sun gear S0, the rotation speed of the carrier C0, and the rotation speed of the ring gear R0, respectively. The intervals between the vertical axis S, the vertical axis C, and the vertical axis R are set so that when the interval between the vertical axis S and the vertical axis C is 1, the interval between the vertical axis C and the vertical axis R becomes gear ratio ρ (the number of teeth ZS of the sun gear S0/the number of teeth ZR of the ring gear R0).

In the planetary gear device 26, when a reaction torque from the first motor/generator MG1 is input to the sun gear S0 while the output torque TE of engine 24 is input to the carrier C0, a torque TE greater than the torque input from the engine 24 appears on the ring gear R0 that is the output element, so that the first motor/generator MG1 functions as an electric power generator. While the rotation speed of the ring gear R0 (output shaft rotation speed) NOUT is constant, the rotation speed NE of the engine 24 can be continuously (steplessly) changed by changing the rotation speed NMG1 of the first motor/generator MG1 upward or downward. The dashed line in FIG. 2 shows a state where the rotation speed NE of the engine 24 lowers when the rotation speed NMG1 of the first motor/generator MG1 is lowered from the value shown by a solid line. That is, a control of setting the rotation speed NE of the engine 24 at, for example, a rotation speed that provides the best fuel economy, can be executed by controlling the first motor/generator MG1. This type of hybrid system is termed mechanical distribution system or split type.

Referring back to FIG. 1, the automatic transmission 22 is constructed of one set of a Ravigneaux type planetary gear mechanism. Specifically, in the automatic transmission 22, a first sun gear S1 and a second sun gear S2 are provided, and short pinions P1 mesh with the first sun gear S1. The short pinions P1 also mesh with long pinions P2 whose axial length is longer than that of the short pinions P1. The long pinions P2 mesh with a ring gear R1 that is disposed concentrically with the sun gears S1, S2. The pinions P1, P2 are supported by a common carrier C1 so as to be rotatable about their own axes and also revolvable. Besides, the second sun gear S2 meshes with the long pinions P2.

The second motor/generator MG2 is controlled by the motor-generator-controlling electronic control device (MG-ECU) 34 via an inverter 40 to function as an electric motor or an electric power generator for thereby adjusting or setting the assist-purpose output torque or the regenerative torque. The second motor-generator MG2 is linked to the second sun gear S2, and the carrier C1 is linked to the output shaft 14. The first sun gear S1 and the ring gear R1, together with the pinions P1, P2, construct a mechanism that corresponds to a double-pinion type planetary gear device. The second sun gear S2 and the ring gear R1, together with the long pinions P2, construct a mechanism that corresponds to a single-pinion type planetary gear device.

The automatic transmission 22 is also provided with a first brake B1 that is provided between the first sun gear S1 and a transmission housing 42 for selectively fixing the first sun gear S1, and a second brake B2 that is provided between the ring gear R1 and the transmission housing 42 for selectively fixing the ring gear R1. These brakes B1, B2 are hydraulic friction engagement devices that produce the engaging force by friction force. As the brakes, it is possible to adopt multi-plate type engagement devices or band-type engagement devices. Then, each of the brakes B1, B2 is constructed so that the torque capacity thereof continuously changes in accordance with the engagement pressure that is generated by a hydraulic actuator or the like.

In the automatic transmission 22 constructed as described above, when the second sun gear S2 functions as an input element and the carrier C1 functions as an output element and the first brake B1 is engaged, the high gear position i.e. step H having speed change ratio γsh greater than "1" is achieved. If the second brake B2 is engaged instead of the first brake B1 in a similar situation, the low gear position i.e. step L having the speed change ratio γsl greater than the speed change ratio γsh of the high gear position H is set. The shifting between the high and low gear positions H and L is executed on the basis of states of run of the vehicle such as the vehicle speed V, the accelerator operation amount $A_{cc}$ or the required drive power Tv etc. More concretely, speed change step regions are determined beforehand as a map (shift chart), and a control is performed such as to set either one of the speed change positions i.e. steps in accordance with the detected vehicle driving state. A shift-controlling electronic control device (T-ECU) 44 made up mainly of a microcomputer for performing the control is provided.

The electronic control device 44 is supplied with detection signals from an oil temperature sensor TS for detecting the temperature (AT temperature) of the oil (working oil), a hydraulic switch SW1 for detecting the engagement oil pressure of the first brake B1, a hydraulic switch SW2 for detecting the engagement oil pressure of the second brake B2, a hydraulic switch SW3 for detecting the line pressure PL, etc. Besides, a MG2 rotation speed sensor 43 for detecting the rotation speed NMG2 of the second motor/generator MG2, and an output shaft rotation speed sensor 45 for detecting the rotation speed NOUT of the output shaft 14 corresponding to the vehicle speed V supply the signals representing those rotation speeds.

Figure 3:
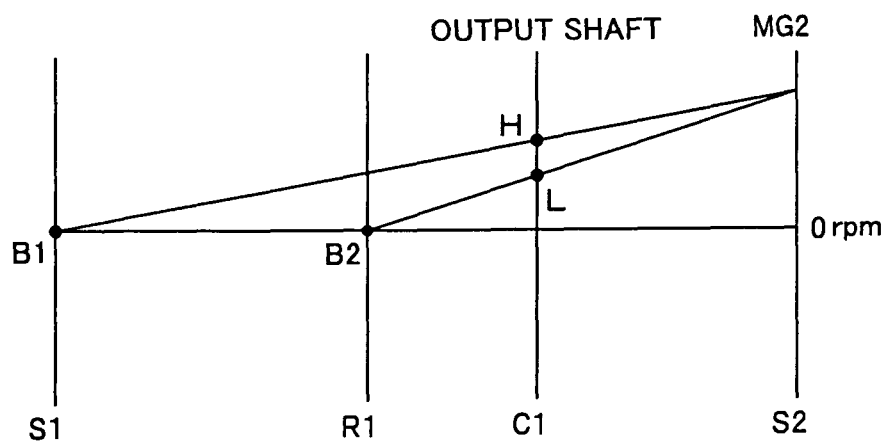
FIG. 3 is a collinear view explaining a plurality of shift positions of an automatic transmission provided between a second motor/generator MG2 and an output shaft in the drive control device for the hybrid vehicle of FIG. 1.

FIG. 3 shows an alignment chart that has four vertical axes, that is, a vertical axis S1, a vertical axis R1, a vertical axis C1, and a vertical axis S2, in order to represent relative relationships between the rotating elements of the Ravigneaux type planetary gear mechanism that constitutes the automatic transmission 22. The vertical axis S1, the vertical axis R1, the vertical axis C1, and the vertical axis S2 show the rotation speed of the first sun gear S1, the rotation speed of the ring gear R1, the rotation speed of the carrier C1, and the rotation speed of the second sun gear S2, respectively.

In the automatic transmission 22 constructed as described above, when the ring gear R1 is fixed by the second brake B2, the low gear position L is set, and the assist torque output from the second motor/generator MG2 is amplified in accordance with the corresponding speed change ratio γsl, and is thus applied to the output shaft 14. On the other hand, when the first sun gear S1 is fixed by the first brake B1, the high gear position H having the speed change ratio γsh that is smaller than the speed change ratio γhl of the low gear position L is set. Since the speed change ratio γsh of the high gear position H is also larger than "1", the assist torque output from the second motor/generator MG2 is amplified in accordance with the speed change ratio γsh, and is applied to the output shaft 14.

Figure 4:
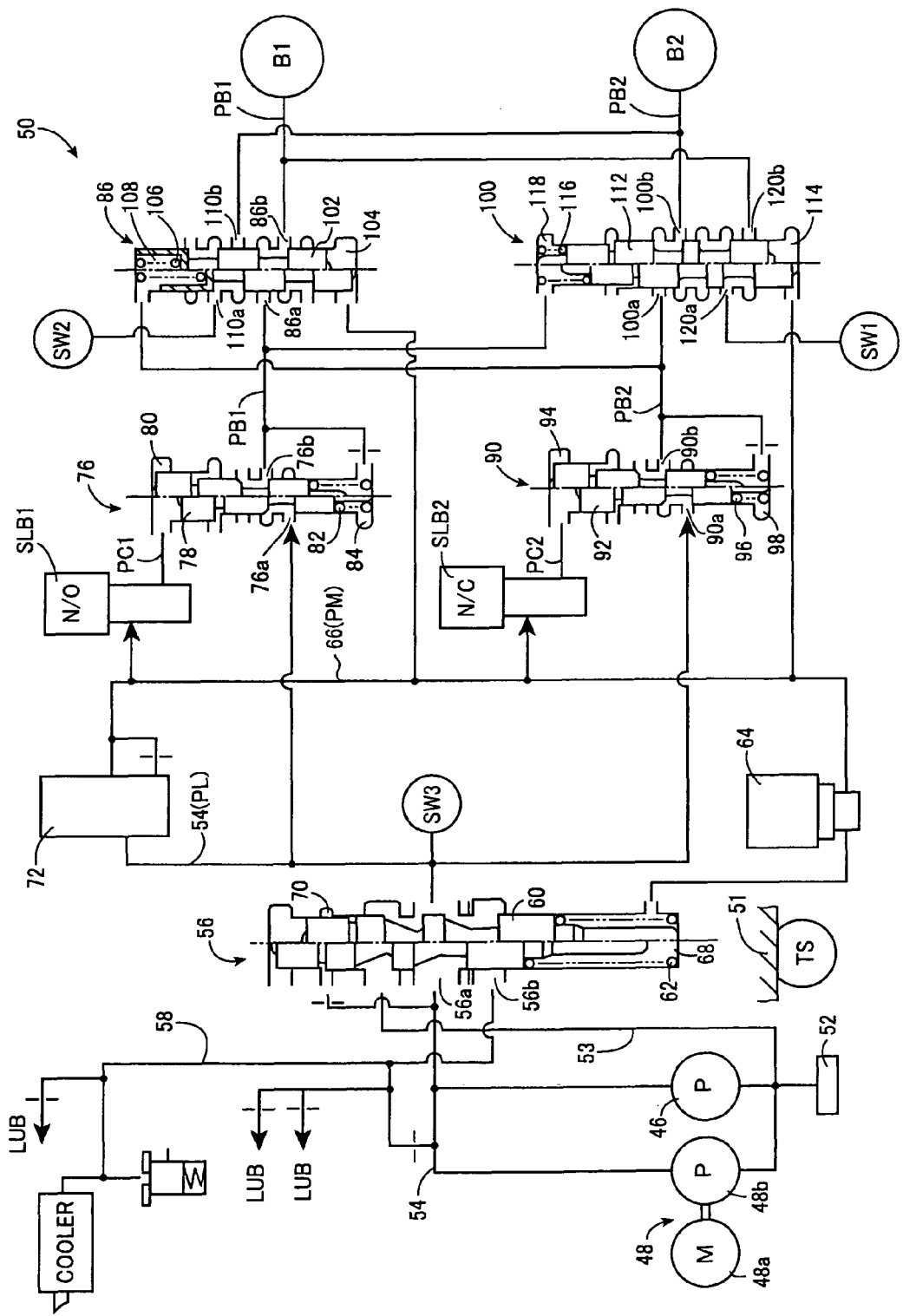
FIG. 4 is a hydraulic circuit diagram explaining main parts of a hydraulic control circuit for performing the shift control of the automatic transmission of FIG. 1.

FIG. 4 shows a shift-purpose hydraulic control circuit 50 for automatically controlling the shifting of the automatic transmission 22 by engaging and releasing the brakes B1, B2. The hydraulic control circuit 50 includes, as oil pressure sources, a mechanical type hydraulic i.e. oil pump 46 that is operatively linked to the crankshaft 36 of the engine 24 and is rotationally driven by the engine 24, and an electric type hydraulic i.e. pump 48 that includes a pumping electric motor 48a and a pump 48b that is rotationally driven by the pumping electric motor 48a. The mechanical type hydraulic pump 46 and the electric type hydraulic pump 48 suck the working oil that is refluxed to an oil pan (not shown), via a strainer 52, or suck the working oil that is directly refluxed via a reflux oil passageway 53, and pumps the working oil to a line pressure oil passageway 54. An oil temperature sensor TS for detecting the oil temperature TOIL of the refluxed working oil (AT oil temperature) is provided on a valve body 51 that partially forms the hydraulic control circuit 50, but may also be connected to a different site.

A line pressure regulating valve 56 is a relief-type pressure regulating valve, and includes a spool valve element 60 that opens and closes between a supply port 56a connected to the line pressure oil passageway 54 and a discharge port 56b connected to a drain oil passageway 58, a control oil chamber 68 which houses a spring 62 that generates thrust in the closing direction of the spool valve element 60 and which receives a module pressure PM from a module pressure oil passageway 66 via an electromagnetic open-close valve 64 when the set pressure of the line pressure PL is altered to a higher level, and a feedback oil chamber 70 connected to the line pressure oil passageway 54 which generates thrust in the opening direction of the spool valve element 60. The line pressure regulating valve 56 outputs a constant line pressure PL that is one of a low pressure and a high pressure. The line pressure oil passageway 54 is provided with a hydraulic switch SW3 that is in an off-state when the line pressure PL is at the high pressure-side value, and that is in an on-state when the line pressure PL is at the low pressure-side value or lower.

A module pressure regulating valve 72 outputs to the module pressure oil passageway 66 a constant module pressure PM that is set lower than the low pressure-side line pressure PL, using the line pressure PL as a basic pressure, regardless of fluctuations of the line pressure PL. A first linear solenoid valve SLB1 for controlling the first brake B1 and a second linear solenoid valve SLB2 for controlling the second brake B2, using the module pressure PM as a basic pressure, output control pressures PC1 and PC2 in accordance with drive currents ISOL1 and ISOL2 that are command values from the electronic control device 44.

Figure 5:
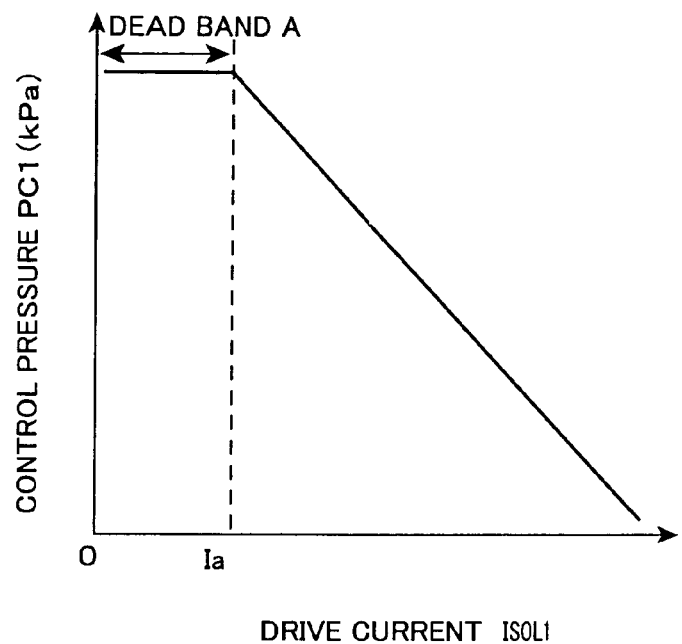
FIG. 5 is a view explaining a hydraulic characteristic of a first linear solenoid valve SLB1 of FIG. 4.
Figure 6:
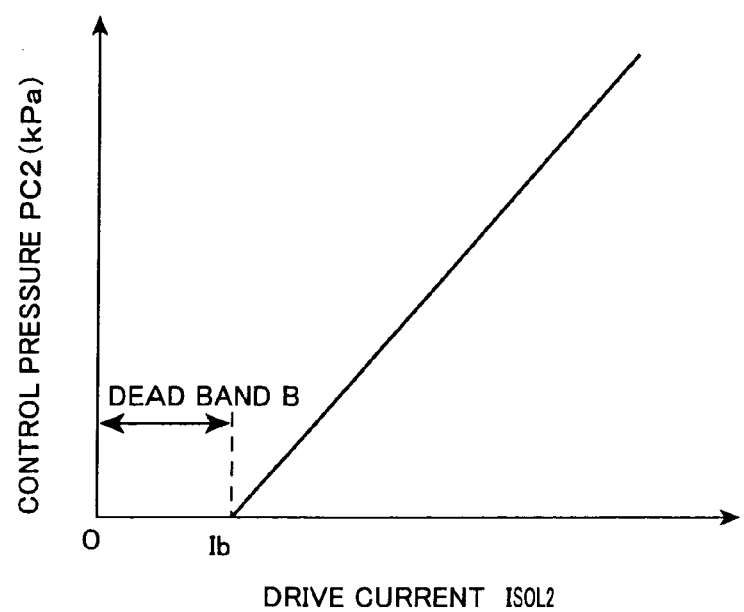
FIG. 6 is a view explaining a hydraulic characteristic of a second linear solenoid valve SLB2 of FIG. 4.

The first linear solenoid valve SLB1 has a normally open type (N/O) valve characteristic of establishing an open valve (communicated) state between the input port and the output port during the non-electrified state. As shown in FIG. 5, as the drive current ISOL1 increases, the output control pressure PC1 is dropped. As shown in FIG. 5, the valve characteristic of the first linear solenoid valve SLB1 is provided with a dead band A in which the output control pressure PC1 does not drop until the drive current ISOL1 exceeds a predetermined value Ia. The second linear solenoid valve SLB2 has a normally closed type valve (N/C) characteristic of establishing a closed (shut-off) state between the input port and the output port during the non-electrified state. As shown in FIG. 6, as the drive current ISOL2 increases, the output control pressure PC2 is increased. As shown in FIG. 6, the valve characteristic of the second linear solenoid valve SLB2 is provided with a dead band B in which the output control pressure PC2 does not increase until the drive current ISOL2 exceeds a predetermined value Ib.

A B1 control valve 76 includes a spool valve element 78 that opens and closes between an input port 76a connected to the line pressure oil passageway 54 and an output port 76b that outputs a B1 engagement oil pressure PB1, a control oil chamber 80 that receives the control pressure PC1 from the first linear solenoid valve SLB1 in order to urge the spool valve element 78 in the opening direction, and a feedback oil chamber 84 which houses a spring 82 that urges the spool valve element 78 in the closing direction and which receives the B1 engagement oil pressure PB1 that is the output pressure. The B1 control valve 76, using the line pressure PL in the line pressure oil passageway 54 as a basic pressure, outputs the B1 engagement oil pressure PB1 whose magnitude is in accordance with the control pressure PC1 from the first linear solenoid valve SLB1, and supplies it to the first brake B1 through a B1 apply control valve 86 that functions as an interlock valve.

A B2 control valve 90 includes a spool valve element 92 that opens and closes between an input port 90a connected to the line pressure oil passageway 54 and an output port 90b that outputs a B2 engagement oil pressure PB2, a control oil chamber 94 that receives the control pressure PC2 from the second linear solenoid valve SLB2 in order to urge the spool valve element 92 in the opening direction, and a feedback oil chamber 98 which houses a spring 96 that urges the spool valve element 92 in the closing direction and which receives the B2 engagement oil pressure PB2 that is the output pressure. The B2 control valve 90, using the line pressure PL in the line pressure oil passageway 54 as a basic pressure, outputs the B2 engagement oil pressure PB2 whose magnitude is in accordance with the control pressure PC2 from the second linear solenoid valve SLB2, and supplies it to the second brake B2 through a B2 apply control valve 100 that functions as an interlock valve.

The B1 apply control valve 86 includes a spool valve element 102 which opens and closes an input port 86a that receives the B1 engagement oil pressure PB1 output from the B1 control valve 76 and an output port 86b connected to the first brake B1, an oil chamber 104 that receives the module pressure PM in order to urge the spool valve element 102 in the opening direction, and an oil chamber 108 which houses a spring 106 that urges the spool valve element 102 in the closing direction and which receives the B2 engagement oil pressure PB2 output from the B2 control valve 90. The B1 apply control valve 86 is held in the open valve state until it is supplied with the B2 engagement oil pressure PB2 for engaging the second brake B2. When the B2 engagement oil pressure PB2 is supplied, the B1 apply control valve 86 is switched to the closed valve state, so that the engagement of the first brake B1 is prevented.

The B1 apply control valve 86 is provided with a pair of ports 110a and 110b that are closed when the spool valve element 102 is in the open valve position (position as indicated on the right side of a center line shown in FIG. 4), and that are opened when the spool valve element 102 is in the valve closed position (position as indicated on the left side of the center line shown in FIG. 4). The hydraulic switch SW2 for detecting the B2 engagement oil pressure PB2 is connected to the port 110a, and the second brake B2 is directly connected to the other port 110b. The hydraulic switch SW2 assumes an on-state when the B2 engagement oil pressure PB2 becomes a high-pressure state that is set beforehand, and is switched to an off-state when the B2 engagement oil pressure PB2 reaches or goes below a low-pressure state that is set beforehand. Since the hydraulic switch SW2 is connected to the second brake B2 via the B1 apply control valve 86, it is possible to determine the presence/absence of an abnormality of the first linear solenoid valve SLB1, the B1 control valve 76, the B1 apply control valve 86, etc., that constitute the hydraulic system of the first brake B1, as well as the presence/absence of an abnormality of the B2 engagement oil pressure PB2.

The B2 apply control valve 100, similar to the B1 apply control valve 86; includes a spool valve element 112 that opens and closes between an input port 100a that receives the B2 engagement oil pressure PB2 output from the B2 control valve 90 and an output port 100b connected to the second brake B2, an oil chamber 114 that receives the module pressure PM in order to urge the spool valve element 112 in the opening direction, and an oil chamber 118 which houses a spring 116 that urges the spool valve element 112 in the closing direction and which receives the B1 engagement oil pressure PB1 output from the B1 control valve 76. The B2 apply control valve 100 is held in the open valve state until it is supplied with the B1 engagement oil pressure PB1 for engaging the first brake B1. When the B1 engagement oil pressure PB1 is supplied, the B2 apply control valve 100 is switched to the closed valve state, so that the engagement of the second brake B2 is prevented.

The B2 apply control valve 100 is also provided with a pair of parts 120a and 120b that are closed when the spool valve element 112 is in the open valve position (position as indicated on the right side of a center line shown in FIG. 4), and that are opened when the spool valve element 112 is in the valve closed position (position as indicated on the left side of the center line shown in FIG. 4). The hydraulic switch SW1 for detecting the B1 engagement oil pressure PB1 is connected to the port 120a, and the first brake B1 is directly connected to the other port 120b. The hydraulic switch SW1 assumes an on-state when the B1 engagement oil pressure PB1 becomes a high-pressure state that is set beforehand, and is switched to an off-state when the B1 engagement oil pressure PB1 reaches or goes below a low-pressure state that is set beforehand. Since the hydraulic switch SW1 is connected to the first brake B1 via the B2 apply control valve 100, it is possible to determine the presence/absence of an abnormality of the second linear solenoid valve SLB2, the B2 control valve 90, the B2 apply control valve 100, etc., that constitute the hydraulic system of the second brake B2, as well as the presence/absence of an abnormality of the B1 engagement oil pressure PB1.

Figures 7, 8:
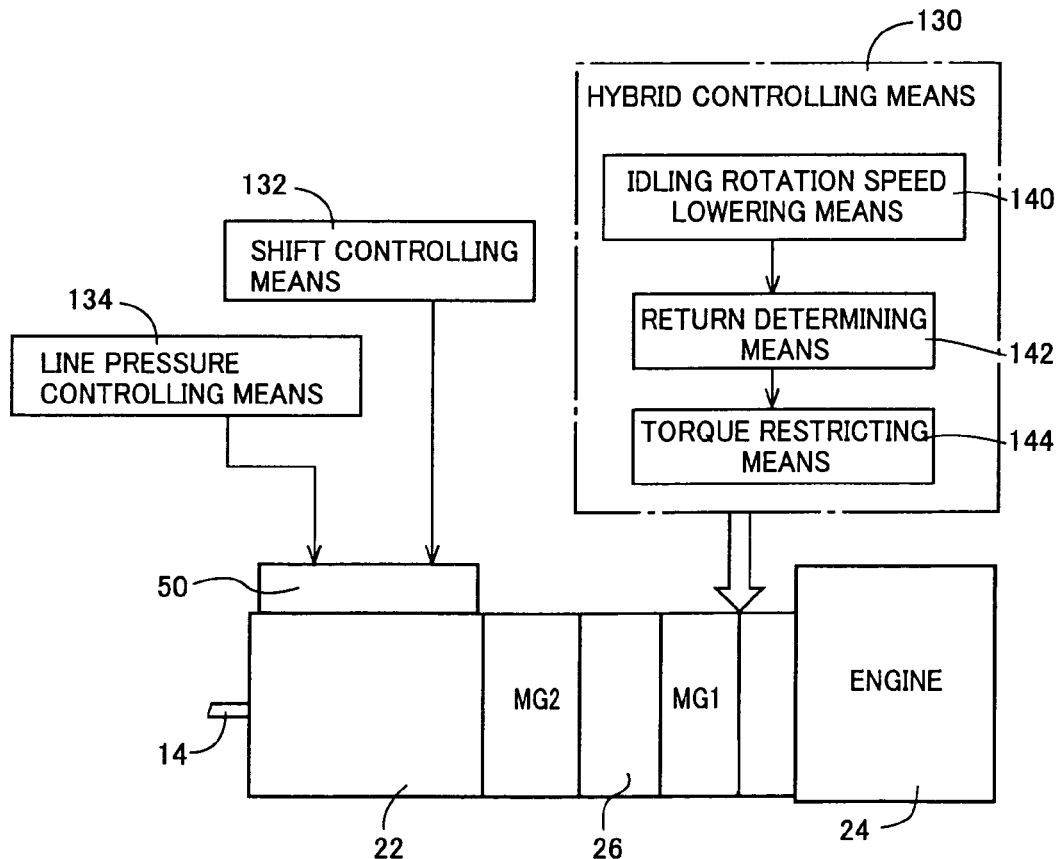
FIG. 7 is an operation table showing each shift position of the automatic transmission of FIG. 1 and the operation state of a linear solenoid valve and a brake for establishing the same.
FIG. 8 is a block diagram explaining various types of functions carried by an electronic control device provided in the drive control device for the hybrid vehicle of FIG. 1.

FIG. 7 is a table illustrating operations of the hydraulic control circuit 50 constructed as described above, that is, showing a relation between a magnetized state of the linear solenoid valves SLB, SLB2, and operating state of the brakes B1, B2. In FIG. 7, symbol "largecircle" shows the excited state or the engaged state, and symbol "x" shows the non-excited state or the released state. That is, by putting both the first linear solenoid valve SLB1 and the second linear solenoid valve SLB2 into the excited state, the first brake B1 is put into the released state and the second brake B2 is put into the engaged state, so that the low gear position L of the automatic transmission 22 is achieved. By putting both the first linear solenoid valve SLB1 and the second linear solenoid valve SLB2 into the non-excited state, the first brake B1 is put into the engaged state and the second brake B2 is put into the released state, so that the high gear position H of the automatic transmission 22 is achieved.

FIG. 8 is a functional block diagram explaining the main parts of control functions of electronic control devices 28, 34, and 44. In FIG. 8, for example, after insertion of a key into a key slot with the brake pedal 29 operated, a power switch is operated to activate a control. Then, a hybrid controlling means 130 calculates the required drive force Tv by a driver based on an accelerator operation amount Acc, a vehicle speed V, and the like, and it controls the torque of the first drive force generation source 12 and/or the second motor/generator MG2 in order to obtain the required drive force Tv. For example, the engine 24 is operated on the optimum fuel economy curve so as to generate the drive force.

At the same time, following modes are switched according to a running state. The modes include an assist running mode that assist the shortage for the required drive force Tv by the second motor/generator MG2, a starting/acceleration mode, a motor running mode that stops the engine 24 and uses the second motor/generator MG2 exclusively as a drive source, a charge running mode that generates electricity by the first motor/generator MG1 by the power of the engine 24, and runs using the second motor/generator MG2 as a power source, an engine running mode that runs by mechanically transmitting the power of the engine 24 to driving wheels, and the like.

In the starting/acceleration mode, during the increasing of the required drive force Tv, that is, upon the starting time and the acceleration time, the output torque TE of the engine 24 and an electrical regenerative torque of the first motor/generator MG1 are both increased. Thus, the torque of the first derive force generation source 12 is increased, and at the same time, a power torque TMG2 of the second motor/generator MG2 is increased. Further, in the starting and acceleration mode, the torques of the first drive force generation source 12 and the second motor/generator MG2 are increased at a predetermined distribution ratio according to the respective required drive forces Tv.

During a coast running, the first motor/generator MG1 or the second motor/generator MG2 is rotationally driven by inertia energy possessed by the vehicle. As a result, the rotation is regenerated as a power to be stored in an electric storage device 32, and to apply a braking force to the vehicle. The second motor/generator MG2 may only perform a generative control. When the engine 24 is put into a fuel cutting state, the first drive force generation source 12 is stopped the rotation thereof by rotational resistance and the first motor/generator MG1 is reversely rotated according to a vehicle speed V. As a result, the regeneration control of the first motor/generator MG1 forcibly rotates the engine 24 in the forward direction. Based on the rotational resistance (frictional loss, pumping loss, and the like) at this time, the braking force applied to the output shaft 14. When the electric storage device 32 is fully charged (chargeable power shortage) and is unable to be recharged, the first motor/generator MG1 is rotationally driven (powered) in the forward direction by the power obtained by the regenerative control of the second motor/generator MG2, so that the rotation speed NE of the engine 24 is forcibly increased. As a result, the rotational resistance of the engine 24 can apply the braking force to the output shaft 14.

Figure 9:
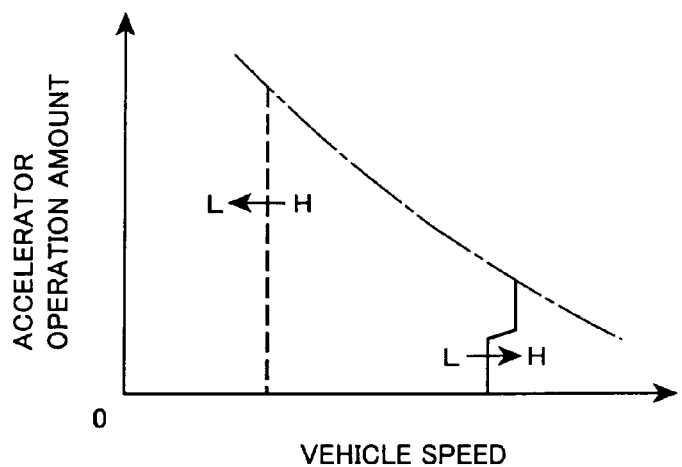
FIG. 9 is a view showing one example of a shift chart (map) used in the shift control of the automatic transmission performed by a shift controlling means of FIG. 8.

A shift controlling means 132 determines the gear position of the automatic transmission 22 using a shift chart (shift map) stored in advance shown in FIG. 9 based on the vehicle speed V and the accelerator operation amount Acc, and it controls a first brake B1 and a second brake B2 for establishing that gear position. The solid line of FIG. 9 is an up-shift line to switch from the low gear position L to the high gear position H, and a broken line is a down-shift line to switch from the high gear position H to the low gear position L, both being provided with the predetermined hysteresis. When a gear position of the automatic transmission 14 to be shifted is determined according to the shift chart shown in FIG. 9, engagement oil pressures PB1 and PB2 of the brakes B1 and B2 are changed according to the predetermined change pattern to execute the switching from the current gear position to the gear position.

Specifically, a shift controlling means 132 controls drive currents ISOL1 and ISOL2 which are oil pressure command values therefor. For example, in the coast down shift which performs a down-shift during the speed reducing running with the accelerator turned OFF, the drive current ISOL1 controlling the oil pressure PB1 of the first brake B1 located at a releasing side is increased by the predetermined gradient. Thus, the B1 based oil pressure PB1 is lowered by the predetermined gradient to release the first brake B1. In the meantime, the drive current ISOL2 controlling the oil pressure PB2 of the second brake B2 which is located at an engagement side is increased by the predetermined gradient, so that the B2 based oil pressure PB2 is increased by the predetermined gradient. Thus, the second brake B2 is smoothly engaged.

A line pressure controlling means 134 switches the electromagnetic open/close valve 64 from a close state to an open state, when the calculated required drive force Tv by the driver is larger than the output determination value set in advance, or the automatic transmission 22 is under shifting, that is, during shift transient, and the like. In this manner, a module pressure PM is supplied to an oil chamber 68 of a line pressure regulating valve 56 to increase a thrust force that urges a spool valve element 60 in the closing direction only by the predetermined value. Thus, the setting pressure of the line pressure PL is switched from a low pressure state to a high pressure state.

Figure 10:
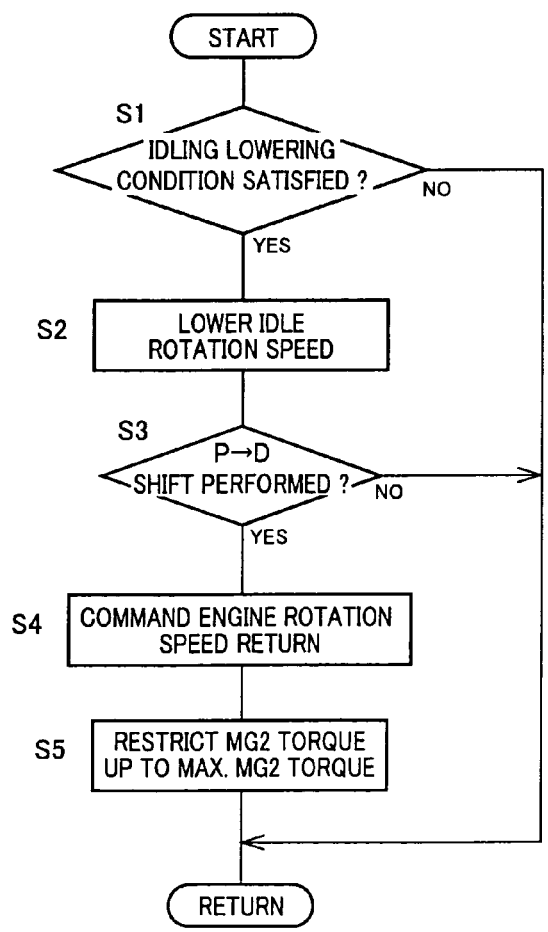
FIG. 10 is a flowchart specifically explaining the content of signal processing executed by an idling rotation speed lowering means, a return determining means, and a torque restricting means carried by the hybrid controlling means of FIG. 8.

Here, the hybrid controlling means 130 including the idling rotation speed lowering means 140, the return determining means 142, and the torque restricting means 144 performs the signal processing according to the flowchart of FIG. 10. As a result, upon the sudden start from the idling state, the hydraulic controlling means 130 prevents the slip of the second brake B2 at a low gear position L side of the automatic transmission 22 to be engaged upon the starting, and a blow up of the second motor/generator MG2. These drawbacks are caused by the hydraulic response delay of the mechanical oil pump 46 driven by the engine 24. Moreover, while avoiding the slip and the blow up, the idling rotation speed N Eidl of the engine 24 is lowered under a fixed condition, to reduce the engine noise during the idling. Steps S1 to S4 of FIG. 10 correspond to the idling rotation speed lowering means 140, and step S3 serves also as the return determining means 142. Step S5 correspond to the torque restricting means 144.

At step S1 of FIG. 10, it is determined whether an idling lowering condition set in advance is satisfied, and when this condition is satisfied, the subsequent steps after step S2 are executed. The idling lowering condition in the present embodiment means is a vehicle stopping state where the accelerator is turned OFF that is the accelerator operation amount Acc is zero (0), and the vehicle speed V=0, and that a shift lever 35 is held at a P position for parking. When these conditions are all satisfied, due to the low possibility of the driver's immediate starting, the lowering control of the idling rotation speed N Eidl of step 2 is executed.

At step S2, the idling rotation speed N Eidl is decreased lower than the ordinary value. The ordinary value means the idling rotation speed N Eidl upon the turning OFF of the accelerator, when the shift lever 35 is held at the running position such as the D position. Specifically, as shown by the solid line of FIG. 12, an AT oil temperature TOIL of the hydraulic control circuit 50 is used as a parameter, and it is made lower than the ordinary time value shown by a chain line across the whole region. The higher the AT oil temperature TOIL is, the higher the rotation speed is. That is, when the AT oil temperature TOIL increases, the viscosity of the oil becomes low and the leaked amount increases, and the oil has to be supplied by that much. Due to the fact that, the higher the AT oil temperature TOIL is, the higher the idling rotation speed N Eidl is, the oil lack caused by the increase of the leaked amount is prevented. In addition, the rise of the engine rotation speed NE resulted from the release of the lowering control of the idling rotation speed N Eidl can raise the oil pressure by the predetermined responsiveness.

At the next step S3, it is determined whether the shift lever 35 is shift-operated to the D position for the forward running from the P position. When a shift-operated is determined, the subsequent steps after step S4 are executed. It is noted that the vehicle does not start immediately by the shift operation from the P position to the D position, but the starting is highly likely to be effectuated soon. Taking this into consideration, step S4 is executed to suppress the oil pressure insufficiency due to the lowering control of the idling rotation speed N Eidl, to release the lowering control of the idling rotation speed N Eidl. As a result, the idling rotation speed N Eidl increases up to the ordinary value shown by the chain line in FIG. 12.

After that, an accelerator pedal 27 is subjected to a pedaling operation (ON operation) to start the starting/acceleration mode, the second brake B2 of the automatic transmission 22 is quickly engaged by the sufficient oil pressure, to establish a low gear position L. The step S3 corresponds to the return determination for determining a high possibility of the engine 24 returning to the normal output state from the idling state. At the time t1 in the time chart of FIG. 11, the lowering control of the idling rotation speed N Eidl is released by shift from the P position to D position.

Now, simultaneously with the shift operation from P to D or immediately after the operation, the accelerator pedal 27 is sometimes deeply depressed. Then, before the engine rotation speed NE reaches the ordinary idling rotation speed N Eidl, the torque TMG2 of the second motor/generator MG2 is raised according to the accelerator operation amount Acc. As a result, the slip of the second brake B2 and the blow up of the second motor/generator MG2 are likely to occur due to the oil pressure insufficiency. To prevent these drawbacks, in the present embodiment, step 5 is executed subsequent to step S4 to temporarily restrict the increase of the torque TMG2 of the second motor/generator MG2.

Figure 11:
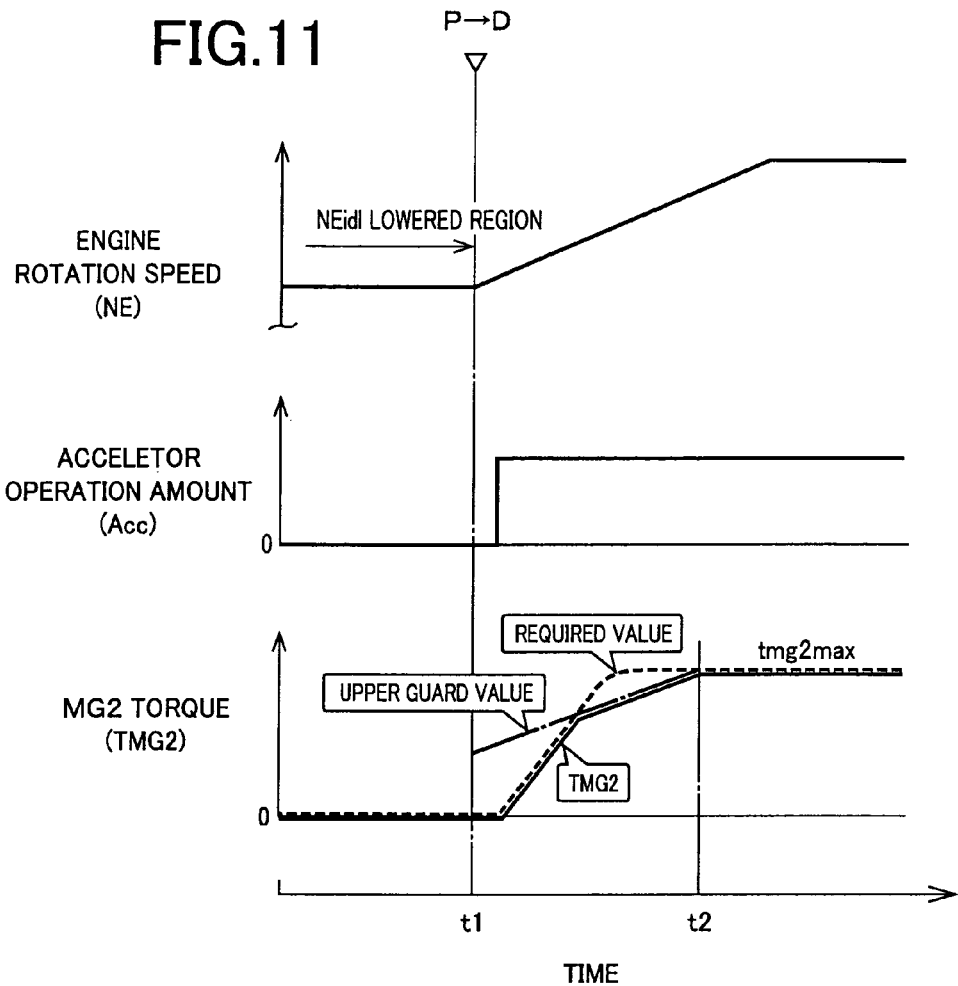
FIG. 11 is an example of the time chart showing the change of an engine rotation speed, an accelerator operation amount, a MGM2 torque TMG2, and the like when the signal processing is performed according to the flow chart of FIG. 10.

Specifically, as shown by the chain line in the column of the MG2 torque TMG2 of FIG. 11, the second motor/generator MG2 is restricted in the MG2 torque TMG2 until reaching the maximum torque tmg2max of by the upper limit guard value which increases high by the predetermined increase gradient. As a result, even when the required value of the MG2 torque TMG2 based on the accelerator operation amount Acc is increased exceeding the upper limit guard value (chain line) as shown by the dot line, the actual MG2 torque TMG2 increases along the upper limit guard value as shown by the solid line. In this manner, the slip of the second brake B2 and the blow up of the second motor/generator MG2 due to oil pressure insufficiency are prevented. In the time t2 of FIG. 11, the upper limit guard value reaches the maximum torque tmg2max, and the torque restriction of the second motor/generator MG2 is terminated.

Figure 13:
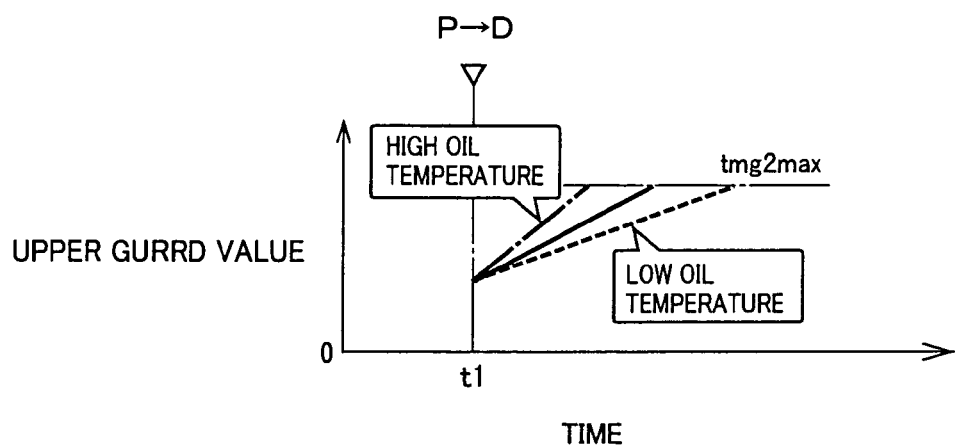
FIG. 13 is a view explaining one example of the upper limit guard value of the torque restriction executed by step S5 of FIG. 10.
Figure 14:
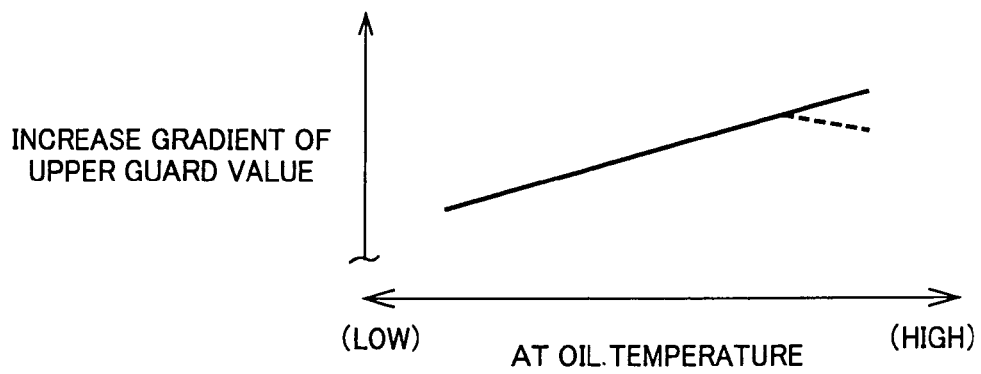
FIG. 14 is a view showing one example of the data map regarding the increase gradient of the upper limit guard value of the torque restriction executed by step S5 of FIG. 10.

The increase gradient of the upper limit guard value is set, as shown in FIGS. 13 and 14, using the AT oil temperature TOIL of the hydraulic control circuit 50 as a parameter to be smaller, as the AT oil temperature TOIL becomes low. That is, when the AT oil temperature TOIL becomes low, the oil becomes high in the viscosity to deteriorate the flow property for thereby deteriorating the hydraulic responsiveness of the second brake B2. Hence, the increase gradient of the upper guard value is made small. As a result, the limit time of the MG2 torque TMG2 becomes long, so that the slip of the second brake B2 and the blow up of the rotation speed NMG2 of the second motor/generator MG2 resulted from the deterioration of the hydraulic responsiveness are suitably prevented. Further, in the high oil temperature when the oil is low in the viscosity and the flow property is good, the hydraulic responsiveness of the second brake B2 becomes quick. Thus, the increase gradient of the upper guard value is made large to shorten the restring time, so that the influence on the starting and acceleration performances are suppressed to the necessity minimum.

The high flow property of the oil resulted from the high AT oil temperature TOIL increases the leaked amount to inhibits rising of the oil pressure. To prevent this, as shown by the broken line in FIG. 14, the increase gradient of the upper limit guard value can be made low or made a constant gradient at the high oil temperature side, which is desirably set in consideration of the setting value of the idling rotation speed N Eidl of FIG. 12.

Figure 12:
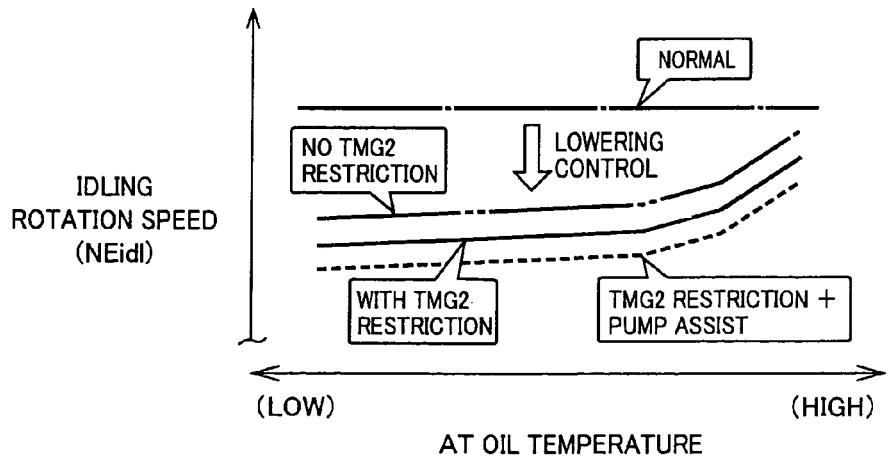
FIG. 12 is a view showing one example of a data map of an idling rotation speed N Eidl lowered by step S2 of FIG. 10.

In the meantime, when the torque TMG2 of the second motor/generator MG2 is restricted in this manner, a feeling of slowness or taking-time an abnormal feeling are likely to be caused upon the sudden start. In the present embodiment, the upper guard value is set relatively high so that such the feeling of slowness and the abnormal feeling are hardly caused. In this case, the slip of the second brake B2 and the blow up of the second motor/generator MG2 due to the hydraulic response delay which is the primary object may become problematic. However, the idling rotation speed N Eidl shown by the solid line in FIG. 12 is set relatively high so that the slip of the second brake B2 and the blow up of the second motor/generator MG2 due to the hydraulic response delay by the restriction of the MG2 torque TMG2 by step S5 are prevented.

That is, with the range where the feeling of slowness and the abnormal feeling are hardly caused upon the sudden start, the torque TMG2 of the second motor/generator MG2 is restricted. At the same time, the idling rotation speed N Eidl during the idling lowering restriction by the idling rotation speed lowering means 140 is set so that the slip of the second brake B2 and the blow up of the second motor/generator MG2 due to the hydraulic response delay by the torque restriction are prevented.

In this manner, in the drive control device 10 for the hybrid vehicle of the present embodiment, when the shift lever 35 is operated from the P position to the D position, a return determination of the engine 24 highly likely to return from the idling state to the normal output state is determined, so that the determination of step S3 is YES (affirmative). At step S5, the torque TMG2 of the second motor/generator MG2 is temporarily restricted by the torque restricting means 144. Hence, due to the small discharge amount of the mechanical oil pump 46 resulted from the low idling rotation speed N Eidl, even when the rising up of the oil pressure is delayed upon the sudden start from the idling state, the slip of the second brake B2 of the automatic transmission 22 engaged upon the starting and the blow up of the rotation speed NMG2 of the second motor/generator MG2 are prevented. As a result, while avoiding the slip of the second brake B2 and the blow up of the second motor/generator MG2 due to the hydraulic response delay, the idling rotation speed N Eidl is lowered, so that the engine noise during the idling state of the engine 24 can be reduced.

Further, when the torque TMG2 of the second motor/generator MG2 is restricted, the starting performance from the idling state is likely to be impaired. In the present embodiment, under a fixed condition including the shift lever 35 being held at the P position, the idling rotation speed lowering means 140 decreases the idling rotation speed N Eidl lower than usual value to thereby reduce the engine noise. On the other hand, only when the shift lever is operated from the P position to the D position so as to release the lowering restriction, the torque TMG2 of the second motor/generator MG2 is restricted by the torque restricting means 144. Hence, upon the starting in the idling state when the shift lever 35 is held at the D position, with the torque TMG2 of the second motor/generator MG2 not restricted by the torque restricting means 144, the influence on the starting performance is suppressed to the necessity minimum.

Further, in the present embodiment, the idling rotation speed N Eidl lowered by the idling rotation speed lowering means 140 is set, with using the AT oil temperature TOIL of the hydraulic control circuit 50 as a parameter, to be higher as the AT oil temperature TOIL becomes high. Hence, despite of the difference of the leaked amount of the oil resulted from the difference of the AT oil temperature TOIL, the oil pressure can be raised by the predetermined responsiveness by the mechanical oil pump 46 resulted from the release of the lowering control of the idling rotation speed N Eidl. In addition, during the low oil temperature when the leaked amount is small, the idling rotation speed N Eidl is further lowered to further reduce the engine noise. That is, as the AT oil temperature TOIL become higher, the viscosity of the oil becomes low to increase the leaked amount. Therefore, the oil has to be supplied by that much. Here, the higher the AT oil temperature TOIL is, the higher the idling rotation speed is. As a result, the oil insufficiency due to the increase of the leaked amount is prevented. In addition, due to the rising of the engine rotation speed NE resulted from the release of the lowering restriction of the idling rotation speed N Eidl, the oil pressure can be raised by the predetermined responsiveness.

Further, in the present embodiment, the restriction of the torque TMG2 of the second motor/generator MG2 by the torque restricting means 144 is set to fall within the predetermined range, specifically, not to cause the feeling of slowness and the abnormal feeling to the driver upon the sudden start from the idling state by the torque restriction. That is, the idling rotation speed N Eidl during lowering by the idling rotation speed lowering means 140 is set relatively high so that the slip of the second brake B2 and the blow up of the second motor/generator MG2 due to the hydraulic response delay by the restriction of this level of the torque TMG2 are prevented. Hence, upon the sudden start from the idling state, the idling rotation speed N Eidl is lowered to thereby lower the engine noise, while the feeling of slowness and the abnormal feeling are hardly caused to the driver by the torque restriction of the second motor/generator MG2, and the slip of the second brake B2 and the blow up of the second motor/generator MG2 due to the hydraulic response delay are avoided.

Further, the torque restricting means 144 restricts the torque TMG2 of the second motor/generator MG2 by the upper limit guard value which increases by the predetermined increase gradient. The increase gradient is set such that, with using the AT oil temperature TOIL as the parameter, the lower the AT oil temperature TOIL is, the smaller the increase gradient is. Hence, despite of the difference of the hydraulic responsiveness by the change of the oil viscosity resulted from the difference of the AT oil temperature TOIL, the MG2 torque TMG2 is appropriately restricted by the torque restricting means 144. As a result, while preventing the slip of the second brake B2 and the blow up of the second motor/generator MG2 due to the hydraulic response delay upon the sudden start from the idling state, the influence by the restriction of the MG2 torque TMG2 on the starting performance can be suppressed as much as possible.

That is, when the AT oil temperature TOIL becomes low, the viscosity of the oil becomes high to deteriorate the flow property, so that the hydraulic responsiveness of the second brake B2 is deteriorated. Taking this into consideration, the increase gradient of the upper limit guard value of the MG2 torque TMG2 is set small so as to prolong the restriction time of the MG2 torque TMG2, thereby preventing the slip of the second brake B2 and the blow up of the second motor/generator MG2 resulted from the deterioration of the hydraulic responsiveness. On the other hand, during the high oil temperature when the viscosity of the oil is low and the flow property is good, the hydraulic responsiveness of the second brake B2 becomes quick. Taking this into consideration, the gradient of the upper limit guard value of the MG2 torque TMG2 is set large to shorten the restriction time, so that the effect of the torque restriction on the starting performance can be suppressed to the necessity minimum.

Next, another embodiment of the present invention will be described. In the following embodiment, the same reference numerals will be added to the portions substantially common to that in the above described embodiment, and the detailed description thereof will be omitted.

Figure 15:
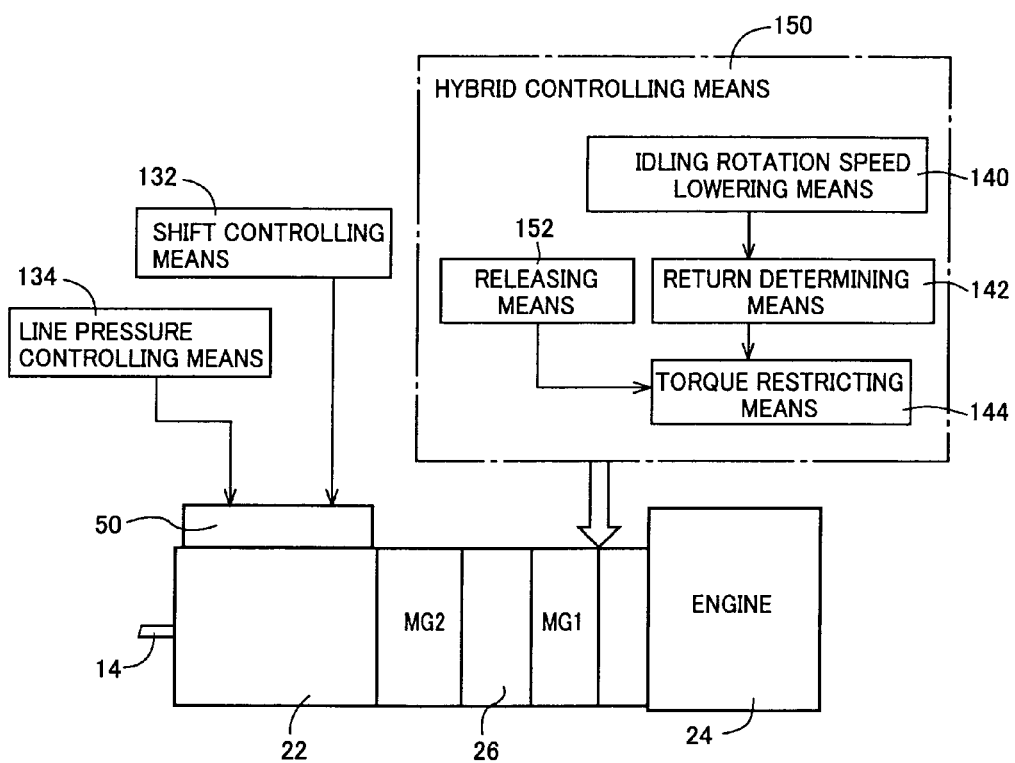
FIG. 15 is a view explaining another embodiment of the present invention, and is a functional block diagram corresponding to FIG. 8.
Figure 16:
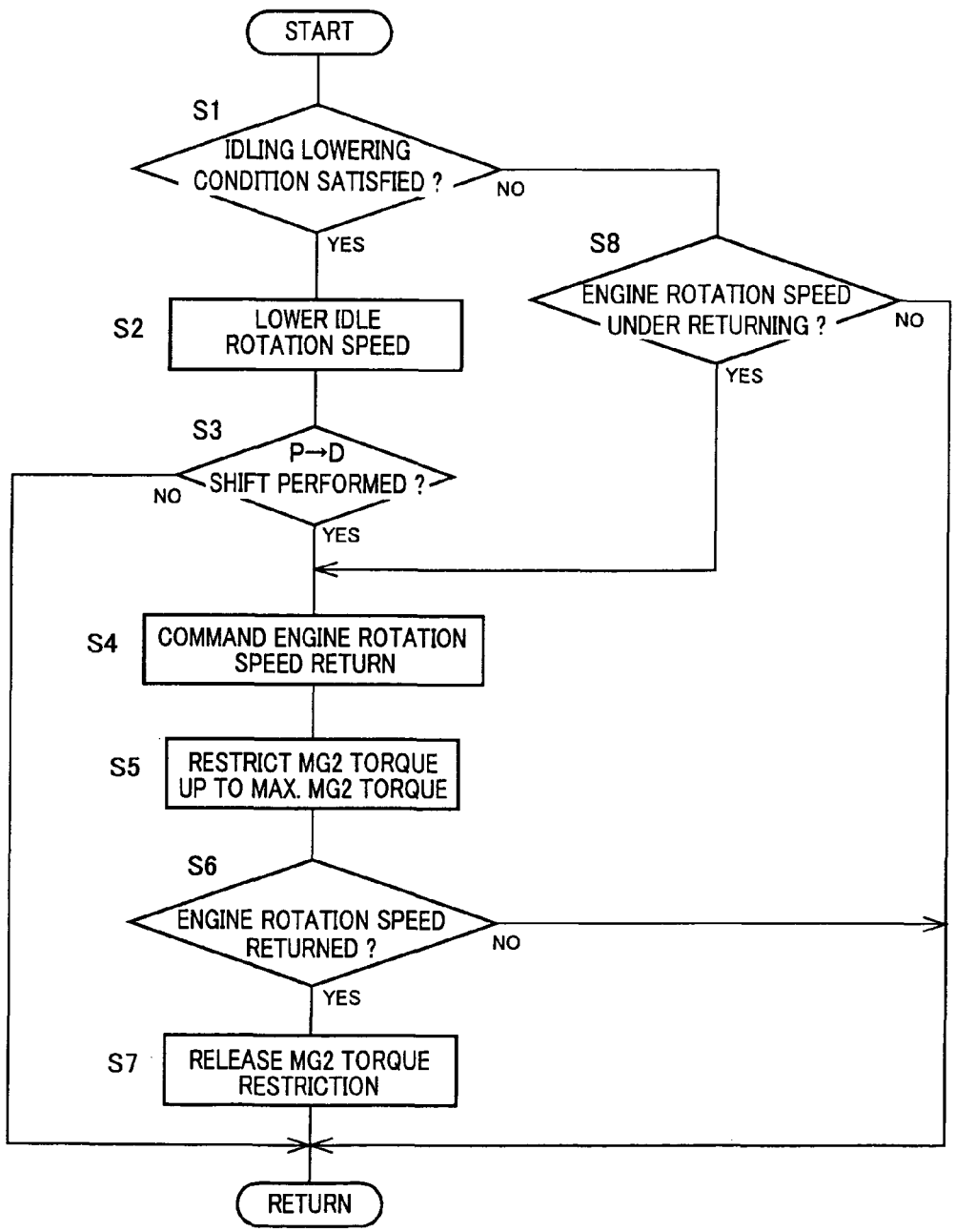
FIG. 16 is a flowchart explaining the operation (signal processing) of the embodiment of FIG. 15.

A hybrid controlling means 150 of FIG. 15 includes in addition to the idling rotation speed lowering means 140, the return determining means 142, and the torque restricting means 144, a release means 152, and performs the signal processing according to the flowchart shown in FIG. 16. Out of each step of the flowchart of FIG. 16, steps S1 to S5 are the same as in FIG. 10, and steps S6 to S8 are newly added. Step S6 and S7 out of them correspond to the release means 152.

In FIG. 16, when the determination of step S1 is negated i.e. denied (NO), that is, the determination of step S1 does not satisfy the idling lowering condition, step 8 is executed. At step S8, a determination is performed using flags and the like whether the engine rotation speed NE is under return from the idling state, that is, the determination of step S6 is YES (affirmative) and resultantly step S7 is executed. If not under the return, the process is terminated as it is, but if step S7 is not yet executed i.e. under the return, the steps subsequent to step S4 are executed.

Subsequent to steps 4 and 5, step S6 is executed to determine whether the engine rotation speed NE returns up to the return rotation speed nehukki where the sufficient oil pressure can be obtained even upon no torque restriction being applied to the second motor/generator MG2. This return rotation speed nehukki is a rotation speed in which the sufficient oil pressure is obtained by the mechanical oil pump 46, which does not cause the slip of the second brake B2 or the blow up of the second motor/generator MG2 by the slip under a fixed condition. The fixed condition means that the torque restriction of the second motor/generator MG2 is released and the MG2 torque TMG2 is increased up to the torque required value which is required according to the accelerator operation amount Acc.

The return rotation speed nehukki is set, for example, with using the accelerator operation amount Acc or the torque required value of the second motor/generator MG2 and the like as the parameter. However, the return rotation speed nehukki may be a fixed value for generating the oil pressure required for transmitting the maximum torque tmg2max of the second motor/generator MG2. A state in which the engine rotation speed NE reaches the return rotation speed nehukki corresponds to the oil pressure restoring state in which the oil pressure capable of securing the torque capacity necessary for the second brake B2 to transmit the torque TMG2 of the second motor/generator MG2 is obtained by the mechanical oil pump 46. In place of the engine rotation speed NE, a hydraulic value and the like detected by a hydraulic switch SW2 and an elapse time from the return command of step S4 can be used to perform the hydraulic restoration determination of step S6.

Figure 17:
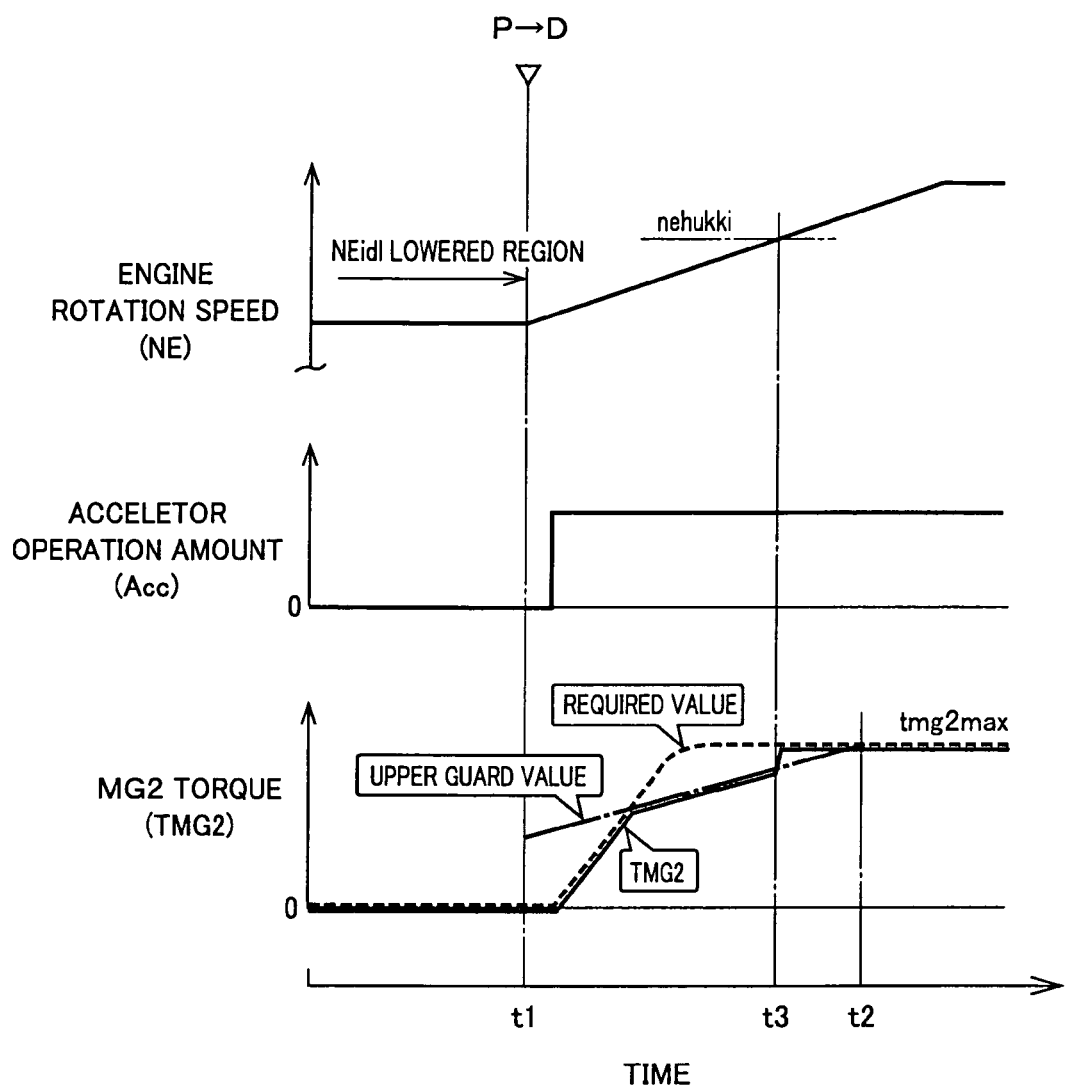
FIG. 17 is one example of the time chart showing the change of the engine rotational speed, the accelerator operation amount, the MG2 torque TMG2, and the like when the signal processing is performed according to the flowchart of FIG. 15.

When the determination of step S6 is NO (negative), the process is terminated as it is, and the subsequent steps after step S1 are repeated. In the meantime, when the engine rotation speed NE reaches the return rotation speed nehukki, step S7 is executed to release the torque restriction of the second motor/generator MG2. As a result, the torque TMG2 of the second motor/generator MG2 quickly increases up to the torque required value which is required according to the accelerator operation amount Acc. Thus, the drive force according to the accelerator operation amount Acc is obtained by the engine 24 and the second motor/generator MG2. In the time t3 in the time chart of FIG. 17, the engine rotation speed NE reaches the return rotation speed nehukki, where the determination of step S6 is YES (affirmative). At step S7, the torque restriction of the second motor/generator MG2 is released.

In this manner, in the present embodiment, the engine 24 returns from the idling state and increases the rotation speed of the mechanical oil pump 46. As a result, the oil pressure restoring state is established in which the oil pressure can be obtained for the second brake B2 to secure the torque capacity necessary for transmitting the torque TMG2 of the second motor/generator MG2. Whether the oil pressure restoring state is established is determined by whether the engine rotation speed NE reaches the return rotation speed nehukki. When this is satisfied, the torque restriction of the second motor/generator MG2 by the torque restricting means 144 is released. Hence, while reliably preventing the slip of the second brake B2 and the blow up of the second motor/generator MG2 due to the hydraulic response delay, the torque restriction of the second motor/generator MG2 by the torque restricting means 144 is suppressed to the necessity minimum, and the influence by this torque restriction on the starting performance can be suppressed to the necessity minimum.

Figure 18:
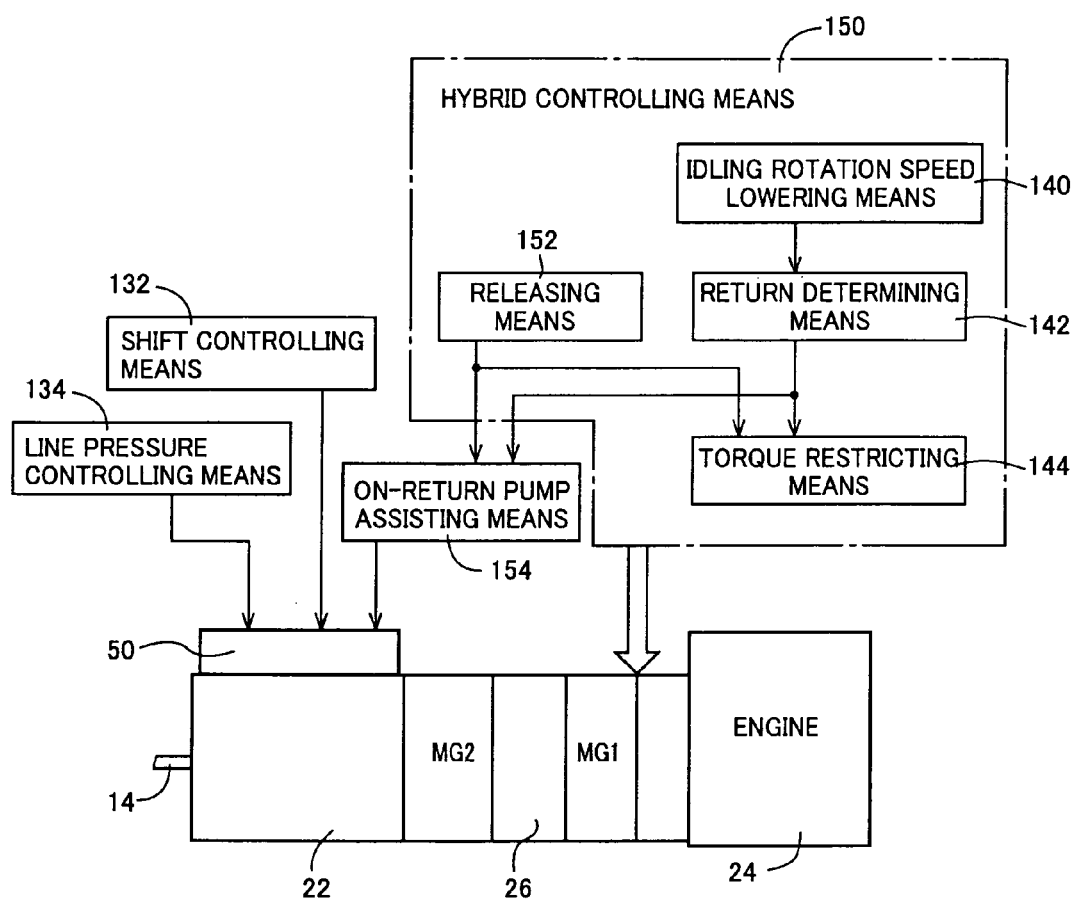
FIG. 18 is a view explaining still another embodiment of the present invention, and is a functional block diagram corresponding to FIG. 8.
Figure 19:
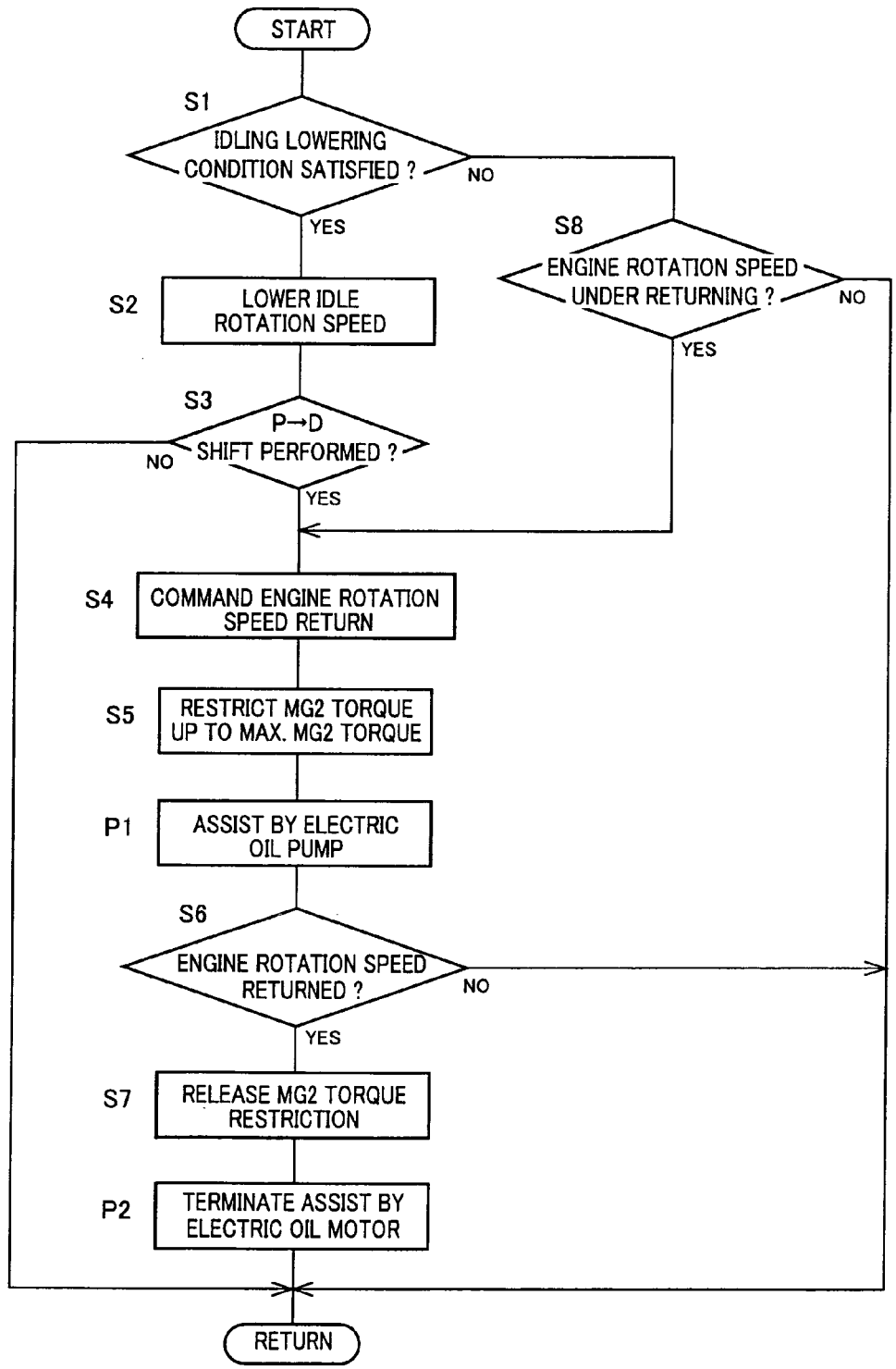
FIG. 19 is a flow chart explaining the operation (signal processing) of the embodiment of FIG. 18.

The embodiment of FIG. 18 is provided with an on-return pump assist means 154 separately from the hybrid controlling means 150, and performs the signal processing according to the flowchart shown in FIG. 19. Out of each step of the flowchart of FIG. 19, steps S1 to S8 are the same as that in FIG. 16, and steps P1 and P2 are newly added. These steps P1 and P2 correspond to the on-return pump assist means 154.

In FIG. 19, step P1 is executed subsequent to the torque restriction of step S5 when the return determination from the idling state is performed at step S3, and operates the electric oil pump 48 to assist the oil supply. This assist intends to increase the oil supply amount by the electric oil pump 48 larger than usual amount. In the present embodiment, the electric oil pump 48 during stopping i.e. under stopped is operated by the assist rotation speed set in advance. This assist rotation speed is set such that the restricted torque TMG2 of the second motor/generator MG2 by the torque restricting means 144 falls within the predetermined range.

Specifically, the assist rotation speed is set such that the feeling of slowness and the abnormal feeling are hardly caused to the driver upon the sudden start from the idling state by the torque restriction. In this manner, the oil supply assists by the electric oil pump 48 further lowers the idling rotation speed N Eidl during lowering by the idling rotation speed lowering means 140 than the above described embodiment (solid line) as shown by the broken line in FIG. 12.

Further, step P2 is executed when the oil pressure restoring determination is performed at step S6 subsequent to the release of the torque restriction of the second motor/generator MG2 in step S7 to terminate the assist of the oil supply by the electric oil pump 48 of step P1.

Figure 20:
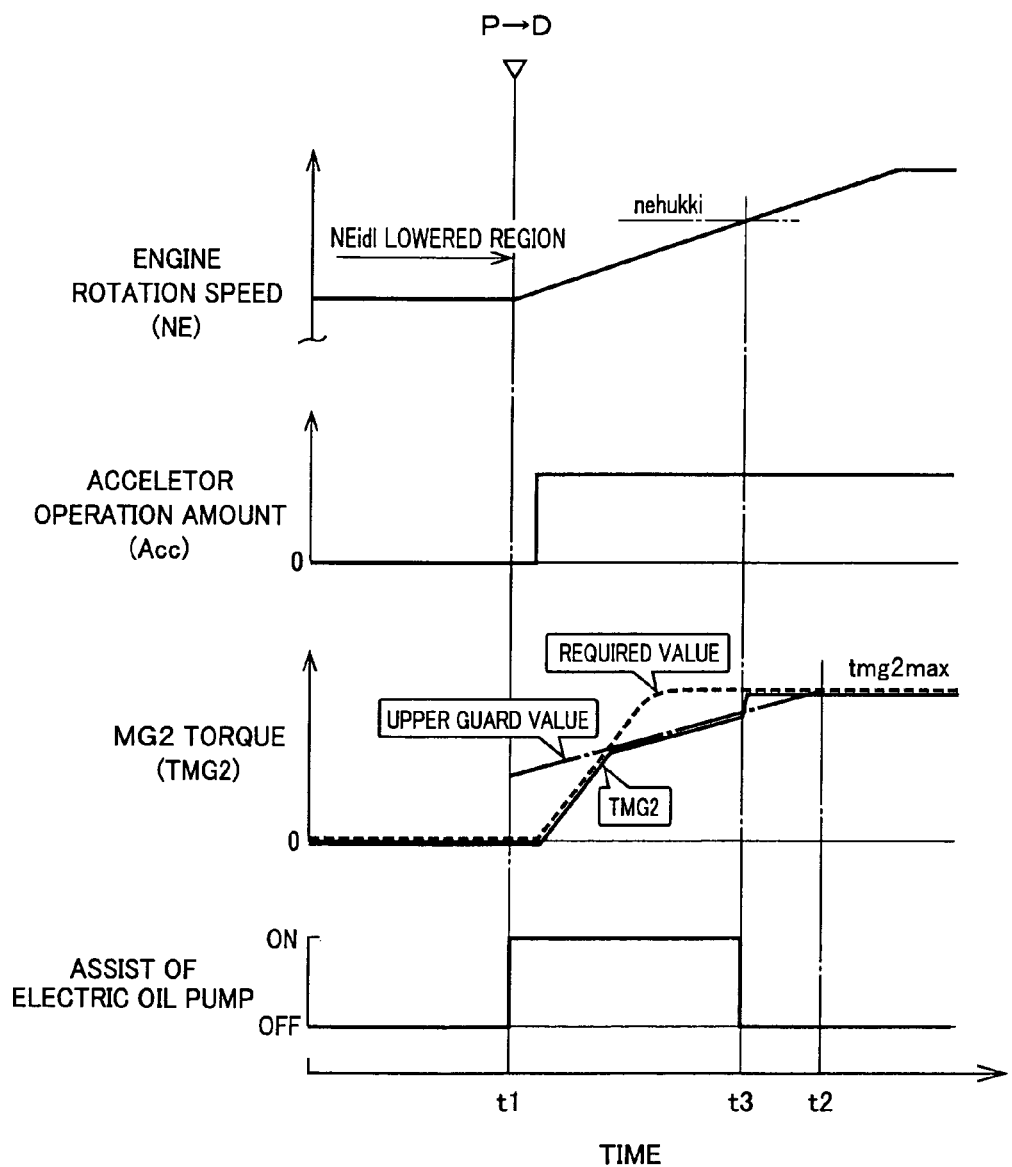
FIG. 20 is one example of the time chart showing the change of the engine rotation speed, the accelerator operation amount, the MG2 torque TMG2, and the like when the signal processing is performed according to the flow chart of FIG. 19.

The time chart of this embodiment is shown in FIG. 20. At the time t1 in which the return determination from the idling state is performed by shifting from P position to D position, the torque restriction of the second motor/generator MG2 is performed, and also the oil supply assist by the electric oil pump 48 is started. On the other hand, at the time t3 in which the engine rotation speed NE reaches the return rotation speed nehukki, the torque restriction of the second motor/generator MG2 is released, and also the assist of the oil supply by the electric oil pump 48 is terminated.

In this manner, in the present embodiment, when the return determining means 142 performs the return determination from the idling state, that is, when the determination of step S3 is YES, the electric oil pump 48 is operated by the on-return pump assist means 154 to perform the assist of the oil supply. This assist is performed such that the torque of the second motor/generator MG2 is restricted by the torque restricting means 144 within the predetermined range. Hence, upon the sudden start from the idling state, the feeling of slowness and the abnormal feeling can be hardly caused to the driver by the torque restriction of the second motor/generator MG2. In addition, the idling rotation speed N Eidl lowered by the idling rotation speed lowering means 140 is further lowered, to further reduce the engine noise.

That is, the torque of the second motor/generator MG2 is restricted within the range hardly causing the feeling of slowness and the abnormal feeling to the driver. In addition, the electric oil pump 48 is operated by the on-return pump assist means 154 so as to assist the oil supply so that the slip of the second brake B2 and the blow up of the second motor/generator MG2 due to the hydraulic response delay by the torque restriction are prevented by such degree restriction. By appropriately setting this assist amount, the idling rotation speed N Eidl during lowering by the idling rotation speed lowering means 140 can be further lowered as shown by the broken line of FIG. 12.

Figure 21:
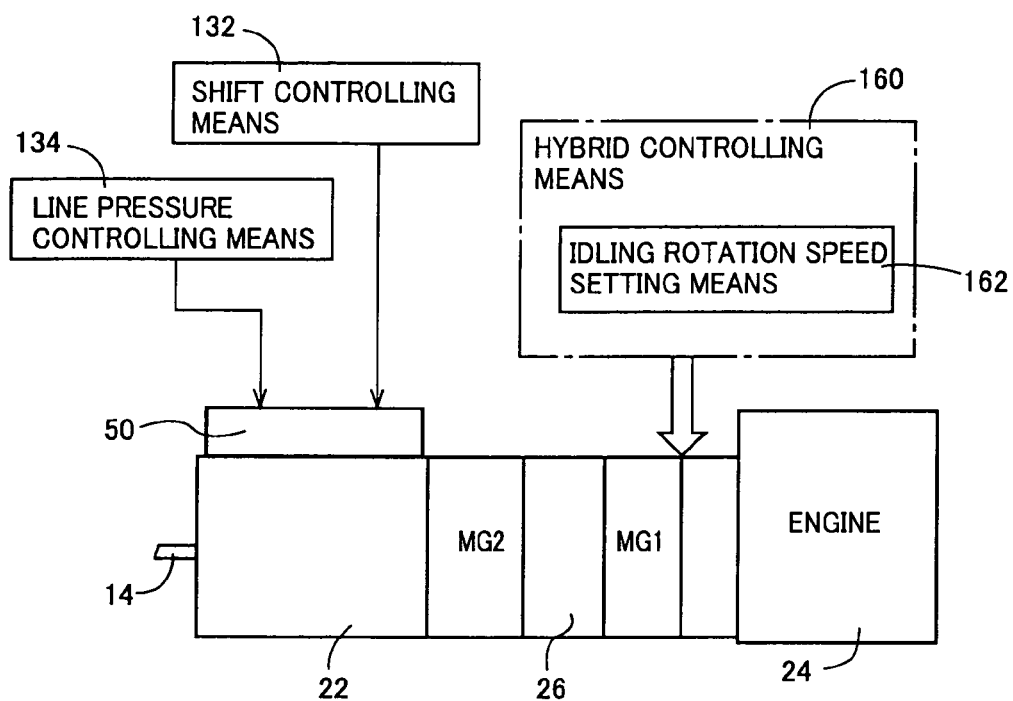
FIG. 21 is a view explaining still another embodiment of the present invention, and is a functional block diagram corresponding to FIG. 8.

An idling rotation speed setting means 162 of a hybrid controlling means 160 in FIG. 21 sets the idling rotation speed N Eidl with using the AT oil temperature TOIL as the parameter. This is set when the engine 24 is returned to the normal output state by the pedaling operation of accelerating pedal 27 and the like from the idling state, and resultantly the rotation speed of the mechanical oil pump 46 is increased by the engine 24. Further, the idling rotation speed N Eidl is set not to perform the torque restriction of the second motor/generator MG2 and the assist of the oil supply by the electrical oil pump 48. It is set such that the oil pressure can be obtained in which the second brake B2 can secure the torque capacity necessary for transmitting the torque TMG2 of the second motor/generator MG2. As shown in FIG. 12 by the two-dot chain line, the idling rotation speed N Eidl is set at a value higher than that in the above described embodiment (solid line). In consideration of the leaked oil, the higher the AT oil temperature TOIL is, the higher value this setting is set.

In this manner, the idling rotation speed N Eidl is set by the idling rotation speed setting means 162 such that the oil pressure can be obtained in which the second brake B2 can secure the torque capacity necessary for transmitting the torque TMG2 of the second motor/generator MG2, when the rotation speed of the mechanical oil pump 46 is increased by the engine 24 during the return from the idling state. Hence, while avoiding the slip of the second brake B2 and the blow up of the second motor/generator MG2 due to the hydraulic response delay upon the sudden start and the sudden acceleration and the like from the idling state, the idling rotation speed N Eidl is lowered as much as possible to reduce the engine noise.

Further, similarly to the above described embodiment, with using the AT oil temperature TOIL as the parameter, the higher the AT oil temperature TOIL is, the higher the idling rotation speed N Eidl becomes. Hence, despite of the difference of the oil leaked amount resulted from the different of the AT oil temperature TOIL, the oil pressure can be raised by the predetermined responsiveness by the mechanical oil pump 46 upon the return from the idling state. In addition, during the low oil temperature with the small oil leaked amount, the idling rotation speed N Eidl is further lowered to further lower the engine noise.

In the above, the embodiments of the present invention have been described based on the drawings. However, it is to be understood that they are only one embodiment, and the present invention can be carried out in the modes added with various modifications and improvements based on the knowledge of those skilled in the art.

The invention claimed is:

1. A drive control device for a hybrid vehicle that includes:
   an engine and an electric motor used as a driving source for running;
   a hydraulic power transmission apparatus disposed at least in a power transmission path of the electric motor to transmit a power based on a torque capacity generated by an oil pressure; and
   an hydraulic control circuit, having a mechanical oil pump driven by the engine and an electric oil pump driven by an electric motor for pumping independent from the electric motor for running, and supplying an oil of a predetermined oil pressure to the hydraulic power transmission apparatus,
   the drive control device comprising:
      return determining means that determines whether the engine returns or has a high possibility of returning to a normal output state from an idling state; and
      torque restricting means that temporarily restricts an increase of the torque of the electric motor for running when the return is determined by the return determining means.

2. The drive control device for hybrid vehicle according to claim 1, wherein the drive control device further includes idling rotation speed lowering means that lowers the idling rotation speed of the engine under a predetermined condition, and the return determining means determines whether a lowering control of the idling rotation speed by the idling rotation speed lowering means is released.

3. The drive control device for hybrid vehicle according to claim 2, wherein the idling rotation speed lowered by the idling rotation speed lowering means is set, with using the oil temperature of the hydraulic control circuit as parameter, to be larger as the oil temperature becomes higher.

4. The drive control device for hybrid vehicle according to claim 2, wherein the idling rotation speed lowered by the idling rotation speed lowering means is set such that the restricted torque of the electric motor for running by the torque restricting means falls within a predetermined range.

5. The drive control device for hybrid vehicle according to claim 1, wherein the torque restricting means restricts the torque of the electric motor for running by an upper limit guard value which becomes large by a predetermined increasing gradient, and the increasing gradient is set, with using the oil temperature of the hydraulic control circuit as a parameter, to be smaller as the oil temperature becomes lower.

6. The drive control device for hybrid vehicle according to claim 1, wherein the drive control device further includes an on-return pump assist means that assists the electric oil pump, the on-return pump assist means operating the electric oil pump to assist a supply of the oil when the return is determined by the return determining means so that the restricted torque of the electric motor for running by the torque restricting means falls within a predetermined range, the on-return pump assist means terminating the assist of the electric oil pump when the engine, returning from the idling state, reaches to an oil pressure restoring state in which an increase of the rotation speed of the mechanical oil pump renders an oil pressure capable of securing a torque capacity necessary for the hydraulic power transmission apparatus to transmit the torque of the electric motor for running.

7. The drive control device for hybrid vehicle according to claim 1, wherein the drive control device further includes release means that releases the torque restriction of the electric motor for running, the release means determining whether the engine, returning from the idling state, reaches to an oil pressure restoring state in which an increase of the rotation speed of the mechanical oil pump renders an oil pressure capable of securing a torque capacity necessary for the hydraulic power transmission apparatus to transmit the torque of the electric motor for running, and the release means releasing the torque restriction of the electric motor of running by the torque restricting means, upon determination of the oil pressure restoring state.

* * * * *